(12) United States Patent
Kosik et al.

(10) Patent No.: US 10,665,206 B2
(45) Date of Patent: May 26, 2020

(54) METHOD AND SYSTEM FOR USER-RELATED MULTI-SCREEN SOLUTION FOR AUGMENTED REALITY FOR USE IN PERFORMING MAINTENANCE

(71) Applicant: HONEYWELL INTERNATIONAL INC., Morris Plains, NJ (US)

(72) Inventors: Michal Kosik, Slovakia (CZ); David Chrapek, Brno (CZ); Katerina Chmelarova, Hradec Kralove (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/048,673

(22) Filed: Jul. 30, 2018

(65) Prior Publication Data

US 2020/0035203 A1     Jan. 30, 2020

(51) Int. Cl.
*G06F 3/01*     (2006.01)
*G09G 5/14*     (2006.01)
(Continued)

(52) U.S. Cl.
CPC .............. *G09G 5/14* (2013.01); *G06F 3/012* (2013.01); *G06F 3/015* (2013.01);
(Continued)

(58) Field of Classification Search
CPC .. G09G 5/14; G09G 5/34; G06F 3/012; G06F 3/013; G06F 3/011; G02B 27/017;
(Continued)

(56) References Cited

U.S. PATENT DOCUMENTS 5,977,935 A * 11/1999 Yasukawa ............ G02B 27/017
340/980
6,198,462 B1    3/2001 Daily et al.
(Continued)

FOREIGN PATENT DOCUMENTS

JP     2016082411 A     5/2016
JP     2016149735 A     8/2016

OTHER PUBLICATIONS

Ens, B., et al.; The Personal Cockpit: A Spatial Interface for Effective Task Switching on Head-Worn Displays; Department of Computer Science, University of Manitoba, Winnipeg, MB, Canada.
(Continued)

*Primary Examiner* — Xuemei Zheng
(74) *Attorney, Agent, or Firm* — Lorenz & Kopf, LLP

(57) ABSTRACT

A method to augment, virtualize, or present mixed reality of content to display a larger amount of content on a head worn device (HWD) including: creating a set of virtual screens in the display of the HWD deployed in a manner to both surround and positionally shift from a movement of the viewer to provide an immersive viewing experience wherein the set of virtual screens include: at least a primary virtual screen and one or more secondary virtual screens; enabling the immersive viewing experience by generating dynamic virtual screen arrangements; connecting a first sensor attached to a head of the viewer and a second sensor attached to a torso of the viewer for generating sensed data of rotating differences of the positionally shift of the viewer; and configuring the content on each of the virtual screens to determine a particular virtual screen having a visual attention of the viewer.

20 Claims, 10 Drawing Sheets

(51) Int. Cl.
*G09G 5/34* (2006.01)
*G06F 3/0481* (2013.01)

(52) U.S. Cl.
CPC ........... *G06F 3/04815* (2013.01); *G09G 5/34* (2013.01); *G09G 2340/0464* (2013.01); *G09G 2354/00* (2013.01)

(58) Field of Classification Search
CPC ...... G02B 2027/014; G02B 2027/0178; G02B 2027/0138; G02B 2027/0187; G02B 2027/0093; G02B 2027/0141; G02B 2027/01; G02B 2027/015; G02B 2027/0181
See application file for complete search history.

(56) References Cited

U.S. PATENT DOCUMENTS

| | | | |
|---|---|---|---|
| 8,108,791 B2 | 1/2012 | Wang et al. | |
| 9,317,972 B2 | 4/2016 | Forutanpour et al. | |
| 9,459,692 B1* | 10/2016 | Li | G06F 3/012 |
| 9,552,676 B2 | 1/2017 | Wong et al. | |
| 9,746,941 B2 | 8/2017 | Raffa et al. | |
| 9,958,937 B2* | 5/2018 | Baba | G06F 3/012 |
| 10,013,808 B2 | 7/2018 | Jones et al. | |
| 2011/0293129 A1* | 12/2011 | Dillen | H04S 7/304 381/370 |
| 2013/0181901 A1 | 7/2013 | West | |
| 2014/0300532 A1 | 10/2014 | Karkkainen et al. | |
| 2014/0347390 A1 | 11/2014 | Poulos et al. | |
| 2015/0302665 A1 | 10/2015 | Miller | |
| 2016/0154242 A1 | 6/2016 | Border | |
| 2016/0306600 A1* | 10/2016 | Shibata | G06F 3/1423 |
| 2017/0060230 A1 | 3/2017 | Faaborg et al. | |
| 2017/0109936 A1 | 4/2017 | Powderly et al. | |
| 2017/0221264 A1 | 8/2017 | Perry | |
| 2017/0329419 A1 | 11/2017 | Dearman et al. | |
| 2017/0344332 A1 | 11/2017 | Chiu et al. | |

OTHER PUBLICATIONS

Orlosky, J.; Adaptive Display of Virtual Content for Improving Usability and Safety in Mixed and Augmented Reality; Jan. 2016.
Chen, W.; Collaboration in Multi-user Immersive Virtual Environment. Graphics [cs.GR]. Universié Paris—Saclay, 2015. English. <NNT : 2015SACLS248>. <tel-01340364v2>.
Traub et al., Advanced Display and Visualization Concepts for Image Guided Surgery Journal of Display Technology, Dec. 2008, pp. 483-490, vol. 4, No. 4, IEEE Service Center, New York.

* cited by examiner

METHOD AND SYSTEM FOR USER-RELATED MULTI-SCREEN SOLUTION FOR AUGMENTED REALITY FOR USE IN PERFORMING MAINTENANCE

TECHNICAL FIELD

Embodiments of the subject matter described herein relate an immersive viewing experience in a head-worn display (HWD), and more particularly, embodiments of the subject matter relate to a method and system deploying a set of virtual screens with each virtual screen configured to be responsive to dual sensors, tensiometers, cameras or the like which are attached to or positioned in a manner to be able to monitor a viewer movement, and to enable an immersive viewing experience that displays content dynamically on each virtual screen taking into account viewer head and torso movement to unclutter objects displayed in a normal view of the viewer when performing maintenance to an aircraft.

BACKGROUND

Augmented reality (AR) is currently being deployed to a number of different industries, such as aerospace, automotive, logistics, and so on. AR type applications may be deployed to users who are equipped with smart glasses and can be enabled to display to the users content that can assist the user in performing various tasks or job functions. Mobile augmented reality systems have the potential to revolutionize the way in which content is provided to users. Virtual content can be directly integrated with the real world surrounding the mobile user, who can interact with it to display related content, to pose and resolve queries, and to collaborate with other users. The augmented view of the user's surroundings presents an interface to context-dependent operations, many of which are related to the objects in view—the augmented world is the user interface.

However, the use of smart glasses when viewing content has drawbacks because of the small virtual screens used in the smart glasses. That is the small virtual screens allow for only a small amount of content to be displayed at any given time. This display constraint often leads to a reduced or degraded user experience that can result in a non-optimal execution time of communications to the user in the display and any displayed subsequent tasks to be performed by the user. This is because the smaller size display of the smart glasses does not allow for all the required content to be timely displayed in a single display of content at once. Also the smaller displays do not provide the additional needed functionalities needed to overcome the deficiencies imposed by a smaller footprint to display content such as enabling the user to switch back and forth between a set of virtual screens of the display each containing a limited content or for an user to navigate menu items for task procedures associated with a maintenance procedure rather than having to view all the tasks on the display at once.

Accordingly, it is desirable to provide a method and system that creates a set of virtual screens in a HWD to dynamically change the content in each virtual screen having the attention of the viewer and to overcome my dynamically displaying content on each virtual screen the drawbacks posed by the small virtual screens of the smart glasses thereby enabling the display of larger amounts of content at any given time as well as better user interaction with displayed content to improve a user's situational awareness and immersive experience.

Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method and system to augment, virtualize, or present mix reality to display a larger amount of content related to execution of an user's job or to an user viewing objects of interest in a normal view while performing a maintenance of systems of an aircraft.

In one embodiment, a method to augment, virtualize, or present mixed reality of content in order to display a larger amount of content on a head worn device (HWD) is provided. The method includes: creating a set of virtual screens in the display of the HWD deployed in a manner to both surround and positionally shift from a movement of the viewer to provide an immersive viewing experience to the viewer wherein the set of virtual screens includes: at least a primary virtual screen and one or more secondary virtual screens wherein the primary virtual screen is located in a manner to permit a normal view and the one or more secondary virtual screens are located around the primary virtual screen positioned in a set of placements including: a right/left and up/down, a default or an arbitrary placement about the primary virtual screen within a view of the viewer; enabling the immersive viewing experience by generating dynamic virtual screen arrangements by a processor associated with the set of virtual screens wherein the set of virtual screens surrounds the viewer and enable the processor to change in real-time the content displayed on each virtual screen; connecting a first sensor attached to a head of the viewer and a second sensor attached to a torso of the viewer for generating sensed data of rotating differences of the positionally shift of the viewer based on the movement of the viewer and an angle of view from the normal view of the viewer; and configuring the content on each of the virtual screens, by the processor, based on the dynamic virtual screen arrangements and the sensed data from the first and second sensors of the rotating differences of the head and torso of the viewer from software solutions of the processor to determine a particular virtual screen having a visual attention of the viewer wherein the visual attention is the virtual screen the viewer is currently viewing or is about to view in a near future.

In various embodiments, the first and second sensors include: inertial measurement units (IMUs). The method, further includes: replacing the first and second sensors with a single sensor of a sensor to measure muscle contractions of the user or a tensiometer wherein the single sensor is sufficient for generating the sensed data of rotating differences of the positionally shifting of the viewer based on the movement of the viewer and the angle of view from the normal view of the viewer. The method further includes: adding another sensor for use with the single sensor wherein the another sensor is one of a set of sensors which include: an IMU, tensiometer, a sensor to measure muscle contraction, or a camera to add sensed data to the sensed data by the single sensor thereby increasing a precision of a data set of the sensed data of the rotating differences between the head and torso of the user to enhance detection accuracies of movements and angles of view of the viewer. The method further includes: changing, by the processor in response to the rotating differences of the head and the torso of the viewer, an amount of content displayed on each virtual screen wherein the content displayed on a particular virtual screen is viewed either as standalone or as connected with content displayed by other virtual screens of the set of virtual screens. The content displayed includes: highlighted areas of interests of a particular virtual screen connected to a corresponding set of information which at least includes: textual instructions, 3D modeling, other related information, unrelated information or desired information by the user on another particular virtual screen. The changing amount of content displayed by: sliding in/out of the amount of content displayed on each virtual screen in response to a continuous movement of the head of the viewer, the sliding in/out determined by the sensed data to maintain, in the virtual screen having the visual attention of the viewer, relevant content within a normal view of the viewer wherein the sliding in/out of content is based on a continuous monitoring by the processor of the sensed data of rotating differences of at least the head of the viewer. The method, further includes: receiving commands by the HWD from the viewer to provide convenient accessibility for executing actions of creating content, interacting with the content, and swapping the content on the virtual screens wherein the commands include: voice, touch, gaze, commands from hardware controllers via standalone buttons or attached keyboards, and gesture commands or in a combination. The method, further includes: configuring, by the processor for the convenient accessibility, the virtual screen having the visual attention of the viewer to remain sparsely filled or nearly empty with content by displaying remaining content on the set of secondary virtual screens or only displaying a limited amount of content on the virtual screen having the visual attention of the viewer. The virtual screens include: regular and irregular shapes.

In another embodiment, a system to augment, virtualize, and present mixed reality of content in order to display a larger amount of content on a head worn device (HWD) is provided. The system includes: a set of virtual screens created in the display of the HWD deployed in a manner to both surround and positionally shift from a movement of the viewer to provide an immersive viewing experience to the viewer wherein the set of virtual screens includes: at least a primary virtual screen and one or more secondary virtual screens wherein the primary virtual screen is located in a manner to permit a normal view and the one or more secondary virtual screens are located around the primary virtual screen positioned in a set of placements including: a right/left and up/down, a default or an arbitrary placement about the primary virtual screen within a view of the viewer; an immersive viewing experience enabled by generating dynamic virtual screen arrangements by a processor associated with the set of virtual screens wherein the set of virtual screens surrounds the viewer and enable the processor to change in real-time the content displayed on each virtual screen; a first sensor attached to a head of the viewer and a second sensor attached to a torso of the viewer for generating sensed data to the processor of rotating differences of the positionally shift of the viewer based on the movement of the viewer and an angle of view from the normal view of the viewer; and a configuration of the content on each of the virtual screens, by the processor, based on the dynamic virtual screen arrangements and the sensed data from the first and second sensors of the rotating differences of the head and torso of the viewer from software solutions of the processor to determine a particular virtual screen having a visual attention of the viewer wherein the visual attention is the virtual screen the viewer is currently viewing or is about to view in a near future.

In various embodiments, the first and second sensors include: inertial measurement units (IMUs). The system, further includes: a single sensor of either a sensor to measure muscle contractions of the user or a tensiometer to replace the first and second sensors wherein the single sensor is sufficient to generate the sensed data of rotating differences of the positionally shift of the viewer based on the movement of the viewer and the angle of view from the normal view of the viewer. The system, further includes: adding another sensor for use with the single sensor wherein the another sensor is one of a set of sensors which include: an IMU, a tensiometer, a sensor to measure muscle contractions, or a camera to generate additional sensed data to be added to the sensed data from the single sensor thereby increasing a precision of a data set of sensed data of the rotating differences between the head and torso of the user to enhance detection accuracies of movements and angles of view of the viewer. The system, further includes: a change in an amount of content displayed on each virtual screen, by the processor in response to the rotating differences of the head and the torso of the viewer, wherein the content displayed on a particular virtual screen is viewed either as standalone or as connected with content displayed by other virtual screens of the set of virtual screens. The content displayed includes: highlighted areas of interests of a particular virtual screen connected to a corresponding set of information which at least includes: textual instructions, 3D modeling, other related information, unrelated information or desired information by the user on another particular virtual screen. The change of the amount of content displayed by: a slide in/out of the amount of content displayed on each virtual screen in response to a continuous movement of the head of the viewer, the slide in/out determined by the sensed data to maintain, in the virtual screen having the visual attention of the viewer, relevant content within a normal view of the viewer wherein the slide in/out of content is based on a continuous monitoring by the processor of the sensed data of rotating differences of at least the head of the viewer. The system, further includes: a set of commands received by the HWD from the viewer to provide convenient accessibility for executing actions of creating content, interacting with the content, and swapping the content on the virtual screens wherein the set of commands include: voice, touch, gaze, commands from hardware controllers via standalone buttons or attached keyboards, and gesture commands or in a combination. The system further includes: a configuration of the set of virtual screens by the processor for the convenient accessibility wherein the virtual screen having the visual attention of the viewer to remain sparsely filled or nearly empty with content by displaying remaining content on the set of secondary virtual screens or only displaying a limited amount of content on the virtual screen having the visual attention of the viewer.

In yet another embodiment, a non-transitory computer-readable medium containing instructions thereon, which, when executed by a processor, perform a method to augment, virtualize, or present mix reality in order to display a larger amount of content on a display of a head worn device (HWD) to maintain an unobstructed view to a viewer is provided. The method includes: creating a set of virtual screens in the display of the HWD deployed in a manner to both surround and positionally shift from a movement of the viewer to provide an immersive viewing experience to the viewer wherein the set of virtual screens includes: at least a primary virtual screen and one or more secondary virtual screens wherein the primary virtual screen is located in a manner to permit a normal view and the one or more secondary virtual screens are located around the primary virtual screen positioned in a set of placements including: a right/left and up/down, a default or an arbitrary placement about the primary virtual screen within a view of the viewer; enabling the immersive viewing experience by generating dynamic virtual screen arrangements by a processor associated with the set of virtual screens wherein the set of virtual screens surrounds the viewer and enable the processor to change in real-time the content displayed on each virtual screen; connecting a first sensor attached to a head of the viewer and a second sensor attached to a torso of the viewer for generating sensed data of rotating differences of the positionally shift of the viewer based on the movement of the viewer and an angle of view from the normal view of the viewer; and configuring the content on each of the virtual screens, by the processor, based on the dynamic virtual screen arrangements and the sensed data from the first and second sensors of the rotating differences of the head and torso of the viewer from software solutions of the processor to determine a particular virtual screen having a visual attention of the viewer wherein the visual attention is the virtual screen the viewer is currently viewing or is about to view in a near future.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
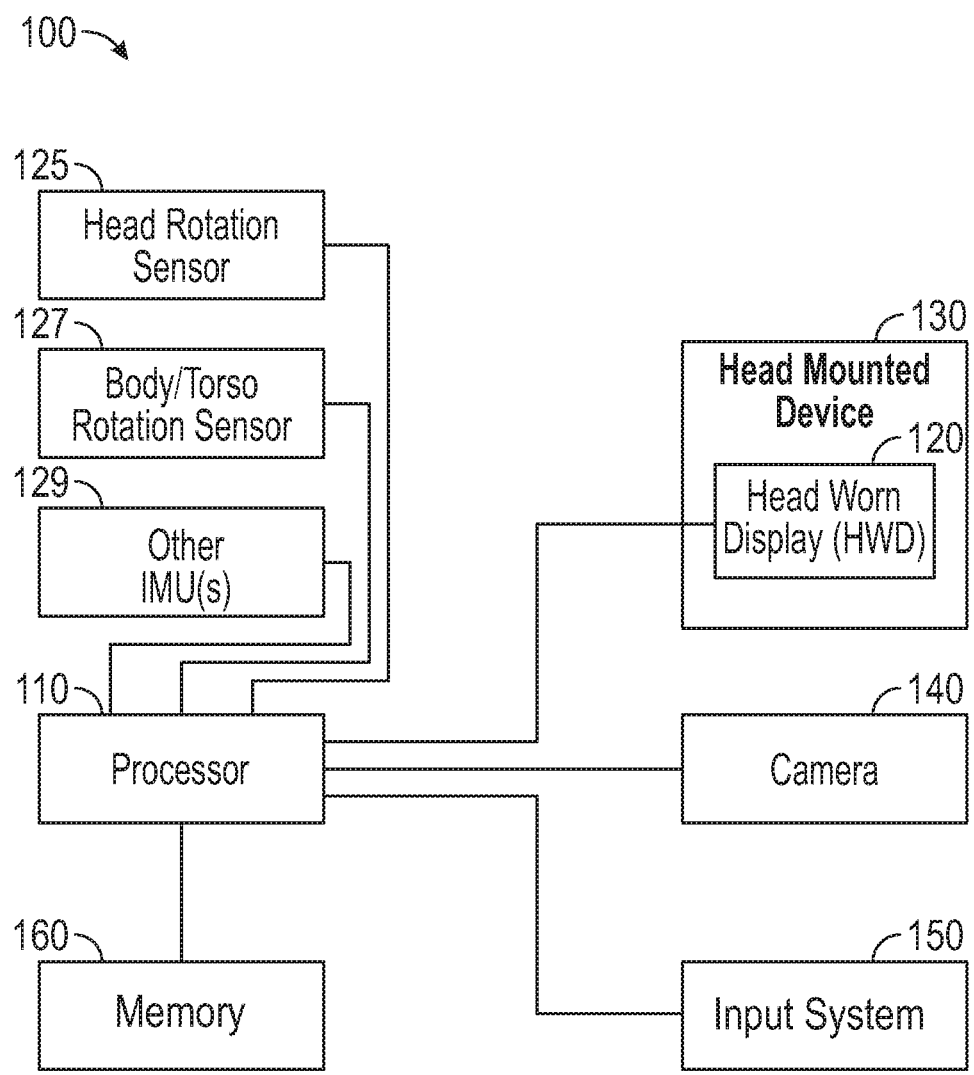
FIG. 1 illustrates a maintenance assistance system using at least two inertial measurement units (IMUs) or other sensors in accordance with various exemplary embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Inputs from wearable devices and interaction technologies enable a mobile user to work with the augmented reality and perform tasks like selecting objects of interest in reality and to a user to further augment the selected object in reality with imagery and/or content which may be within the users field of vision at a given time. The augmented reality virtual screens used can be head-worn virtual screens (HWD), mobile hand-held virtual screens, or virtual screens integrated into the physical reality.

While the present disclosures describes viewed objects used in AR, it is contemplated that other sensed aspects of an object may also be used in the AR methodology described such as hearing, touch, or smell may also be integrated in methodologies and/or used in the system described for mixed reality and augmentation of objects.

In some instances, a user can create an arbitrary number of small windows and attach such windows to images of objects of a real environment when viewed. However, these windows are fixed to the images of the real environment and therefore fail to move in coordination with the user movements. This results in significant less efficacy as it is necessary for a user to change locations often and therefore a significant advantages of AR use of mobility is eliminated. To put it another way, the instant access to all relevant content anytime and anyplace required or as desired by the user when moving is prevented. In addition, manipulation with these windows proves cumbersome and therefore suited only for a sporadic use because of such qualities rather than for routine every day work. In general, the interacting with more content displayed in smart glasses leads to less intuitive control of the whole AR solution and less functionality due to the difficulties of attaching fixed windows to viewed objects by a mobile user.

Another problem that comes with usage of AR and smart glasses is situational awareness. The content displayed in smart glasses often obscures the real world by interfering with the users field of vision. This can be particularly dangerous when the user is moving, using stairs or when he or she is working in elevated places, as the obfuscated areas of visions by content displayed in the smart glasses can results in the viewer not seeing the impediments described and commonly found in a mobile users path.

Also, in mixed reality virtual screens, that is AR features combined with a reality virtual screens there can be multiple views of various aspects of objects, particularly layered views of aspects of objects taking up more footprint on virtual screens and again further obscuring the display of the actual viewpoint to the user. This also poses issues when the user is moving and relying on the displayed viewpoint for situational awareness. The multiple layered views of particular objects in a mixed reality augmented display may lead to obscuring obstacles or impediments in the path of the viewer resulting in potential accidents or missed other features.

The present disclosure describes systems and processes that overcome at least the following three issues found with various AR solutions that use smart glasses as follows: 1) the need to show larger amounts of content in a smart glasses simultaneously which leads to a display of content beyond the ability of the display of the smart glasses to be able to properly or easily presented to a viewer; 2) the interacting with the content which is limited by the size of the display particularly in mixed reality virtual screens of real objects and augmented reality objects of multiple layered views; and 3) a diminishing of an users situational awareness by both obscuring of a particular viewpoint pathway and the significant scaling necessitated by the smaller display size resulting in the imagery not being readily discernable by the viewer. Hence, when these issues are not addressed properly, it can lead to a decreased user experience and a lower user acceptance of AR technology deployment due to perceived notions of obstacles in the viewing experience as well as such AR technology is still in the infancy when it comes to both deployment and acceptability.

In various exemplary embodiments, the present disclosure describes by use of integrated contents showing dynamic content, configuration that enables an intuitive control and interaction with a large amount of content into AR domain without needing to use the established PC and tablet/smart phone paradigms for showing content and manipulation, which are not suitable for use with smart glasses.

In various embodiments, the present disclosure describes sliding in/out, swapping or switching of content from a particular screen to another screen can be enabled by extracting positional content of the user's head in relation to his/her torso to determine on which virtual screen(s) the user is directly viewing at a particular instance.

In various embodiments, the present disclosure describes using two inertial measurement units (IMUs) one is in the HWD. The HWD includes a smart glasses or can be any commercial off the shelf (COTS) solution. The IMU is a commercially available solutions which can be used to monitor or sense data of movement. In this case one IMU is located on the head and is implemented to sense the head movement and the other IMU is located on the user's torso and used to monitor and sense data of torso or body movement. By the use of the two IMU's, the user's head movements (relative to torso) can be calculated. For the head IMU, a variety of IMUs can be used that enable monitoring of movement of the head; for example gyroscopic sensors with motion detection capabilities attached to the head. Also, IMUs of piezoresistive and droplet accelerometers, solid state motion sensors, and the like can be used. In addition, cameras can also be used to monitor head movement either attached to the head or viewing the head for movement. Alternately, tensiometers or stretch measuring sensors can be used also separately from IMUs—however, in all cases, the tensiometers have to be placed on user's neck. This placement on the user's neck would be the same with any muscle contraction measurement sensors used in the alternative. The positioning of other sensors may vary depending on the other solutions capabilities and requirements to enable head and torso movement measuring—e.g. the viewpoint necessitated for measuring movement of the head and torso based on a camera images measuring the head/torso rotation and the camera attached to user's neck or body used to measure the rotation of the head or torso. By using, as an example, either the dual sensors or tensiometer sensors, and coordinating the sensed data of each sensor to an user's visual attention at any given time, the content of the virtual screens environment can be slid in/out, toggled, swapped or manipulated in coordination with motion or movement of each part of the user immediately or in a near future based on an immediate or predicted user movement.

FIG. 1 is a block diagram of a maintenance assistance system 100, in accordance with an embodiment. The maintenance assistance system 100 includes a processor 110. The processor 110 may be a central processing unit (CPU), graphical processing unit (GPU), a physics processing unit (PPU), an application specific integrated circuit (ASIC), a microprocessor, an field programmable logic array, or any other logic circuit or combination thereof. In one embodiment, for example, the processor 110 may be housed in a head worn display (HWD) 120. The HWD display may be configured with virtual screens in various exemplary embodiments including as an example, a line of multiple virtual screens or a cross configuration of virtual screens to provide an immersive viewing experience.

In another embodiment, for example, the processor 110 may be housed in a technician mountable system (not illustrated), such as in a belt or bag which the technician could wear. In addition, the processor 110 may be configured to connect to various sensory components 129 to monitor movement or motion of the viewer including a head rotation sensor 125 coupled to the users head and a torso (or body) rotation sensor 127 coupled to the viewers body to measure the rotation of the viewers body and head. That is, the head rotation sensor 125 and the torso rotation sensor 127 can provide positional and rotational data to determine by the algorithmic solutions of the processor 110 the current position, the predicted angular rotation and the angular rotation movement of the either or both body parts of the user of the user's head and torso independent of each other.

In various exemplary embodiments, the processor may also be coupled to the other sensory components (i.e. a tensiometer, a muscle contraction measuring sensor, a camera or other sensor that is either able to measure the head-torso rotation independently; or with a combination from either head or body/torso rotation sensor inertial measurement unit (IMU)) 129 of the maintenance assistance system 100 via a wire, a wireless system, or any combination thereof (including the head rotation sensor 125 and the torso rotation sensor 127). The wireless system, for example, may be a Bluetooth system, a ZigBee system, a cellular system, a Wi-Fi system, or any other type of communication system, or combination thereof. In another embodiment, for example, the processor 110 may be located remotely from the technician.

In an embodiment, for example, the processor 110 may be in a server or other general purpose computer and may communicate with the other components of the maintenance assistance system 100 via one or more of the wireless systems.

The head worn display (HWD) 120 may be any transparent display that presents data without requiring users to look away from their usual or normal viewpoints. It can be also a non-transparent display which either does not completely obscure an user's normal field of view (e.g. other hands-free interaction solutions); or HWD that streams live video, so the user feels like wearing a transparent display for full immersion with mixed reality experience. In one embodiment, for example, the HWD 120 may be incorporated into a head mounted device 130 of the user like a maintenance technician could wear when performing a maintenance. In various alternate embodiments, the HWD 120 may be incorporated in a mobile device including a smart pad or smart phone or even a set of standalone monitors.

In various exemplary embodiments, the HWD 120 may display a layout of virtual screens around or about the viewer that can be viewed individually or in groups or sets of virtual screens by the user as the user rotates or moves his head with a particular primary screen having the users attention at any given time as shown in and further described in FIGS. 2-9.

The virtual screens are sets of singular or multiple screens that are within the display of an HWD 120 in arbitrary layouts. The display will show or display the virtual screens and dynamically change (i.e. sliding and out content displayed) the content in the virtual screens as instructed by a processor in response to sensed data from at least the torso rotation sensor 127 and the head rotation sensor 125. In addition, the processor 110 can by various application solutions can calculate predicted view of attention to a particular virtual screen based on data of the user head and torso movement by the angular differences derived by the sensed data from the head rotation sensor 125 and the torso rotation sensor 127.

In another embodiment, for example, the HWD 120 may be incorporated into a contact lens having an integrated virtual screen. The HWD 120 may include two components: a display or multiple display units and a combiner type module. The display unit may include an optical collimator setup having a convex lens or concave mirror with a Cathode Ray Tube, light emitting diode, or liquid crystal display at its focus. The combiner type module redirects the image from the display unit in such a way as to see a field of view around the maintenance technician and the projected image at the same time.

The processor 110 provides the interface between the HWD (i.e. the virtual screens) and the systems/data to be displayed and generates the imagery and symbiology to be displayed by the display unit, as discussed in further detail below. In one embodiment, for example, the HWD 120 may also have sensory devices attached to the user to measure all "six degrees of freedom" of technician's head—(movements forward/backward, up/down, left/right and rotation—pitch, yaw, and roll) which can help determine which direction and angle the technician moved their head and therefore it can improve detection. For example, if the processor 110 has previously detected the component and the technician moved their head left, the processor 110 will receive content about this movement and be able to determine that because the head was moved left the component is located right from its previous known location. Accordingly, the processor would not need to look for the component in the whole scene from the camera, but rather only a part of the scene. There are several ways the camera may be attached to technician, for example, on the left or right side of the technicians head (or on both sides, if 2 or more cameras are used), above the head, right above/below the glasses, or on their shoulder.

The maintenance assistance system 100 further includes a camera 140. In one embodiment, for example, the camera 140 may be incorporated into or mounted on the safety head mounted devices 130 (i.e. glasses or the like). As discussed in further detail below, the processor 110 analyzes data from the camera 140 to detect objects in the environment to aid the technician in a maintenance task and can be used to record a maintenance task for quality assurance purposes.

The maintenance assistance system 100 further includes an input system 150. In one embodiment, for example, the input system 150 may be a microphone. In this embodiment, a technician may interact with the maintenance assistance system 100 by speaking into the microphone. The processor 110 would then analyze the speech and output a response to aid the technician in a maintenance task, as discussed in further detail below. In this embodiment, for example, the input system 150 may be incorporated into or mounted on the safety head mounted devices 130.

In other embodiments, for example, the input system 150 may be a keyboard. The keyboard may be a physical keyboard or a virtual keyboard. An image of a keyboard, for example, may be overlaid onto any surface by the HWD 120. The processor 110 may then analyze data from the camera 140 to determine if the maintenance technician is pressing any of the keys on the virtual keyboard. The virtual keyboard may be a standard QWERTY style keyboard or may be a customize keyboard appropriate for the maintenance task. In another embodiment, for example, hand gestures may be captured by the camera and processed into commands by the processor 110. In yet other embodiments, for example, a touch display may be provided as the input system 150. Any combination of input systems may be used.

In yet other embodiments, the input system 150 may be include input system 150 of sensors for eye tracking or gaze. The eye tracking or gaze may be sensed by the smart glasses. The use of eye tracking or gaze in AR and VR may enable configurations for foveated rendering. As the resolutions of XR (AR, VR, MR) virtual screens continue to increase to add to the realism, there will be a need to not render the entire volume of the pixels on the display and only to render what the user views. The gaze by the eye position for AR and VR will determine how sharp the user perceives the image on display, regardless of resolution. The gaze and eye position may also include measurements like IPD (interpupillary distance) which determines how far apart someone's eyes are from one another, a crucial measurement in ensuring that the user views the best possible image quality.

The maintenance assistance system 100 further includes a memory 160. The memory 160 may be any non-transitory computer-readable memory. In one embodiment, for example, the memory may be housed in a technician mountable system, such as in a belt or bag which the technician could wear. In another embodiment, for example, the memory 160 may be located remote from the technician. In this embodiment, for example, the processor 110 may be communicatively coupled to the memory 160 via a wireless communication system, as discussed above. The memory 160 may store non-transitory computer-readable instructions for operating the maintenance assistance system 100, as discussed in further detail below.

The memory 160 may also store maintenance task data as well as data related to mixed reality imagery including AR images. The maintenance task data may include data defining the steps in a maintenance task and related AR step data to assist the maintenance technician in performing the task. The maintenance task data may also include multiple images, 3-D models of various components involved in a maintenance task and augmented display items of various facets of the components and the maintenance task for a mixed reality and augmented display displayed.

The AR imagery of images or 3-D models may be stored, for example, at each stage of a maintenance task. The images or 3-D models may be stored, for example, by a technician who previously performed the maintenance task or they (images/3D models) may be created in a preparation phase (only once per aircraft). As discussed in further detail below, the processor may compare an image/model taken by the camera 140 to one or more of the stored images/models to determine if a task was completed correctly. The processor 110 could determine that a task was completed correctly if the image/model taken by the camera matches the image/model stored in the memory. The maintenance task data may also include three-dimensional model data of components to be serviced.

Figure 2:
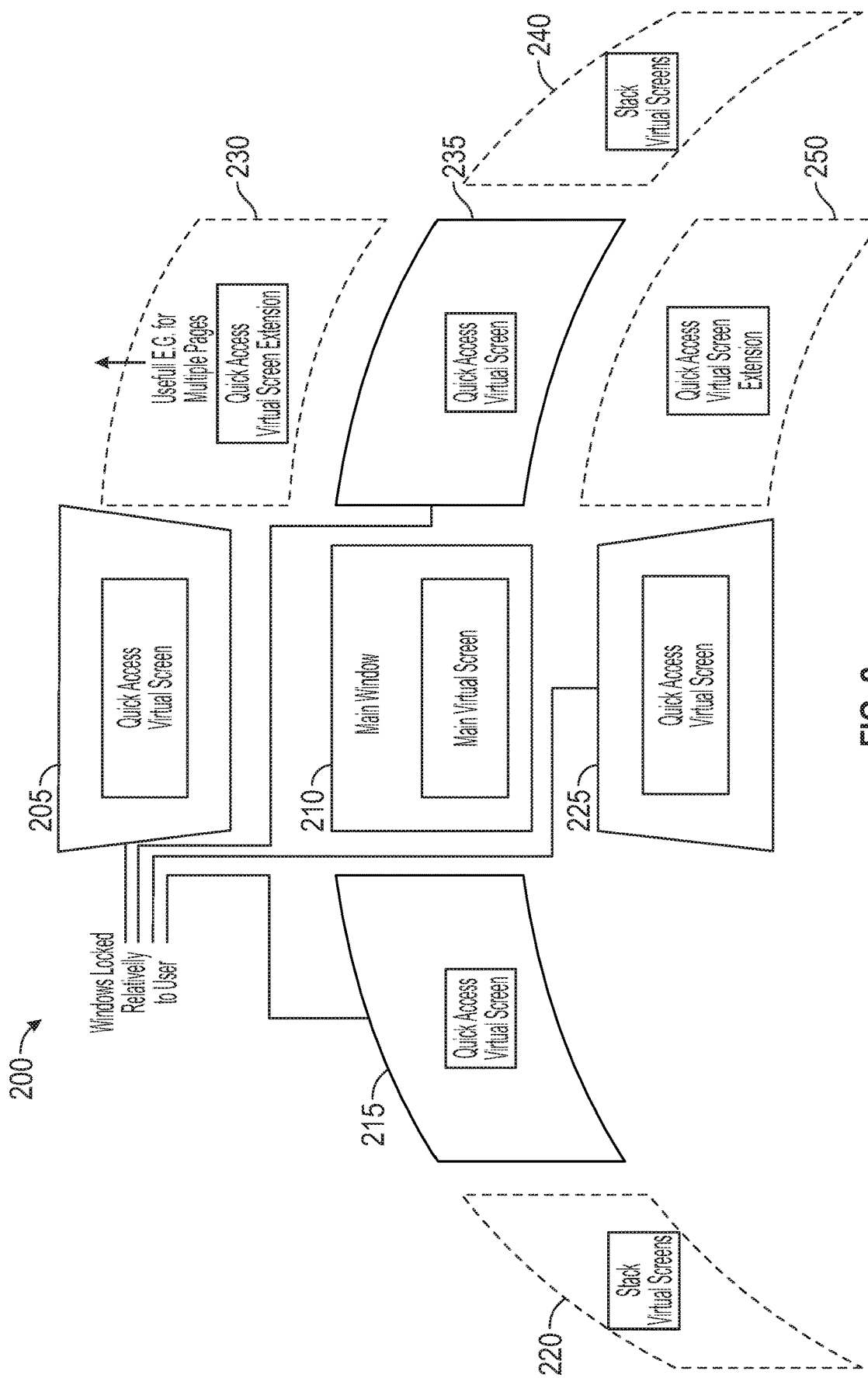
FIG. 2 illustrates an exemplary configuration of virtual screens in the head worn display for displaying content in accordance with exemplary embodiments.

In FIG. 2 there is an exemplary configuration of multiple virtual screens simulating an immersive display of the HWD for displaying AR content in accordance with exemplary embodiments. FIG. 2, shows a layout of virtual screens 200 of virtual screens or a display of the HWD which may be configured in various arbitrary layouts as desired by the user or in patterns or arrangements as deemed best suited for particular tasks or sets of tasks for maintenance (or the like) for displaying both the content needed and augmented content for assistance with the tasks. The layout of virtual screens 200 may include content from the smart glasses within the field of vision of the user wearing the smart glasses. That is, the smart glasses may be configured in a manner to display the content viewed of reality objects by the user on each virtual screen displayed in the layout of the virtual screens 200. In addition, the virtual screens displayed in the layout of virtual screens 200 may include addition augmented reality of sections or other related content of the objects viewed by the user. In other words, the smart glass identifies the objects in reality and the virtual screens 200 display of the layout are configured in a manner to enhance the content displayed on each virtual screen with augmented content not readably available or easily shown on the smart glasses. Rather, the virtual screens 200 displayed of the layout may or can provide mixed reality virtual screens of objects in the real world and objects that are created by systems of aircraft or a connected cloud.

The layout of the virtual screens 200 displayed may be configured with a mobile display with HWD devices and can be designed to follow the user motion by a body-fixed reference frame. The layout of the virtual screens 200 displayed can be configured to switch between a flat world-fixed layout and a curved, body-fixed layout of a set of virtual screens.

In exemplary embodiments, the virtual screens 200 displayed may be configured in 3×3 arrangements of adjacent virtual screens of virtual screen 210, virtual screen 205, virtual screen 225, virtual screen 215, virtual screen 235, virtual screen 230, virtual screen 250, virtual screen 240 with virtual screen 210 as the main virtual screen displayed. Alternately, the layout of virtual screens 200 can be configured in a hexagonal flower arrangement of virtual screens 205, 210, 215, 225, and 235 or a cross arrangement of virtual screens 210, 225, 205, 215 and 235, and so on. The specific layout should be selected based on task to be performed as well as taking into account user preferences, movements, position and viewing angles. For example, usually a task performance is best when the layout of the virtual screens fits fully within view. In instances, of multiple tasks, there may be desired multiple separate virtual screens that are beyond the user's field of vision.

In the center of user's field of vision is the "Main Virtual Screen" (virtual screen 210) which is usually empty (so the user has clear field of view) until important information (or because the user requests particular information) is displayed there. The "Main Virtual Screen" can also be considered the "primary" virtual screen. The other virtual screens (or secondary virtual screens) displayed are positioned adjacent too or around the center display 210 and include as an example virtual screens 215, 205, 235, and 225. In order for an user to view the other virtual screens, the user would need to rotate his/her head for a viewpoint directed to the appropriate virtual screen displayed off center. That is, the user may rotate his/her head to the right/left or up/down. The virtual screens 200 in the layout are positioned in a manner relative to the user and are enabled to rotate or change position in manner that is coordinated to the user. There are however constraints which can include the range of head motion for an user and the performance by direct input of the content needed to be displayed.

Each virtual screen of the display can contain a different piece of content which can be either standalone or connected to other screens of the virtual screens (e.g. showing schematics with highlighted area of interest on one screen and having textual instructions with detailed description of work on another screen). This effectively extends the amount and kind of content that an user can access at any given moment, and enables the user to address content in prior virtual screens of virtual screens that may be still visible in off center virtual screen virtual screens and from previous sections shown to the user without the need for the user to rotate back by input to the content displayed on the virtual screen. In addition, the content which is displayed on the virtual screen maybe serially tracked through the virtual screens displayed to the user.

Figure 3:
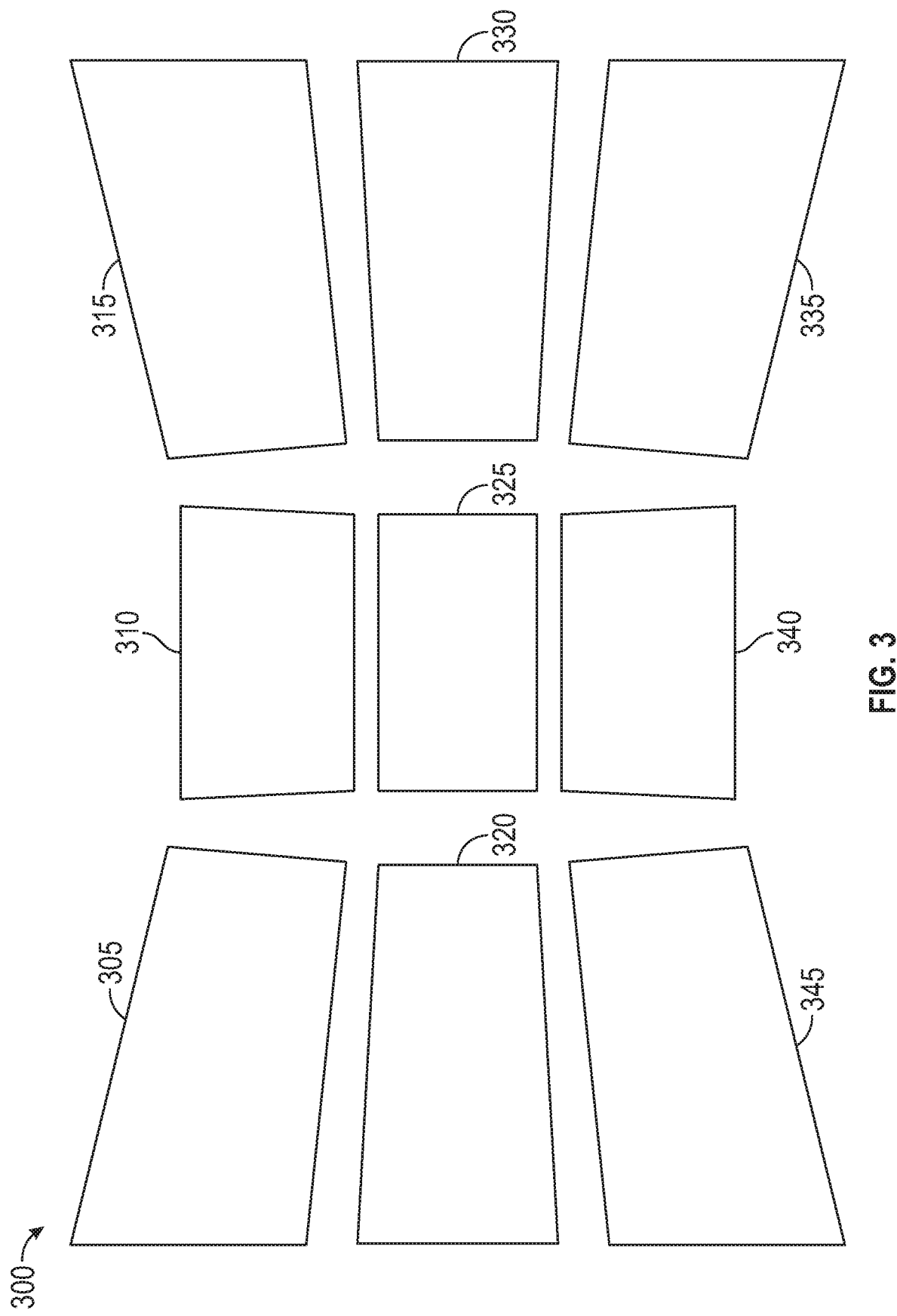
FIG. 3 illustrates an exemplary configuration of virtual screens in the head worn display for displaying content in accordance with exemplary embodiments.

FIG. 3 illustrates a layout of virtual screens with depth perception to the viewer in accordance with an exemplary embodiment. FIG. 3 includes a layout 300 of virtual screens 305, 310, 315, 320, 325, 330, 335, 340 and 345. The virtual screens are configured in irregular rectangular shapes where the content in each of the virtual screens is scaled to given the impression to a viewer of depth in the layout 300 when viewing sets of virtual screens in the layout 300. For example, virtual screen 315 is configured with gradient appearance and scaling down of the content from an outside boundary to an inside boundary of the virtual screen 315. It is contemplated that other irregular shapes and scaling of content in the virtual screen may be configured for different virtual viewing effects for the viewing when viewing layouts of multiple virtual screens.

Figure 4:
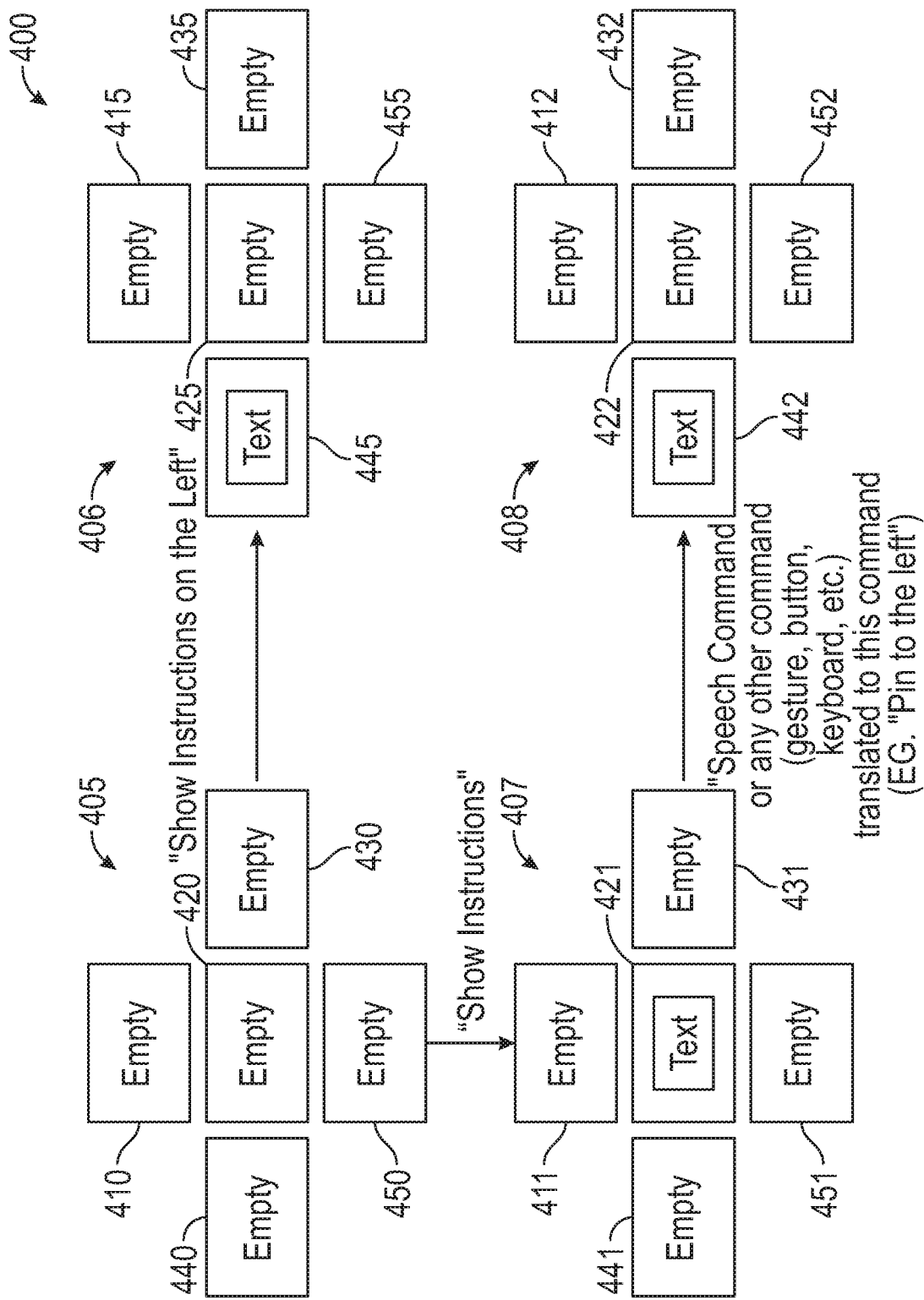
FIG. 4 illustrates content displayed in virtual screens of the head worn display for displaying content in accordance with various exemplary embodiments.

FIG. 4 illustrates a layout of virtual screens 400 with content control in accordance with an exemplary embodiment. In FIG. 4, in a first cross layout 405 having a center virtual screen 420 with an associated entity, two adjacent virtual screens on either side of virtual screen 420 of a left virtual screen 440 and right virtual screen 430. Additionally, a virtual screen 410 displayed above the virtual screen 420 and a virtual screen 450 displayed below the center virtual screen 420 of a display 450. In exemplary embodiments the main virtual screen and sub virtual screens of the virtual screens can be used for showing general, specific and related content. If an object in the real environment is being highlighted in the smart glasses, this highlighting can occur independently on the virtual screens and related content may be accessible by the user on the virtual screens of particular virtual screens.

By using commands either in form of voice instructions, hand/head gestures, hardware buttons, or others, the user can interact with the virtual screens of virtual screens 400—e.g. creating a content (showing content) on a certain virtual screen, moving it to another virtual screen, swapping contents of two virtual screens, and so on.

In various exemplary embodiments, a second cross layout of virtual screens 406 with a set of virtual screens of a center display 425, adjacent right and left virtual screens 445, 435 and top/bottom virtual screens 415 and 425 illustrate instructions in text on a virtual screen 445. For example, the user may when viewing a particular entity on the virtual screen 425 of the center display, may turn his/her heard to the left; this would be detected by the sensor devices attached to the user which monitor user head movements and when the user is viewing the display 445 on the left by movement of his/her head to the left, text would appear on the virtual screen on the left by content control configured to respond to user head movement. This creates a simple way of controlling the AR features by responsive actions of the sensory input from the user's physical movement.

In various exemplary embodiments, a third cross layout of virtual screens 407 with a set of virtual screens of a center display 421, adjacent right and left virtual screens 441, 431 and top/bottom virtual screens 411 and 451. In this instance, in response to a control signal by the processor (not show) of the AR system, text in the center display 421 is displayed on the associated center screen.

In various exemplary embodiments, a fourth cross layout of virtual screens 408 with a set of virtual screens of a center display 422, adjacent right and left virtual screens 442, 432 and top/bottom virtual screens 412 and 452. In this instance, in response to a control signal by the processor (not show) of the AR system, a content control is enabled for text in the center display 421 to be pinned to the left and displayed on the virtual screen of display 442.

Figure 5:
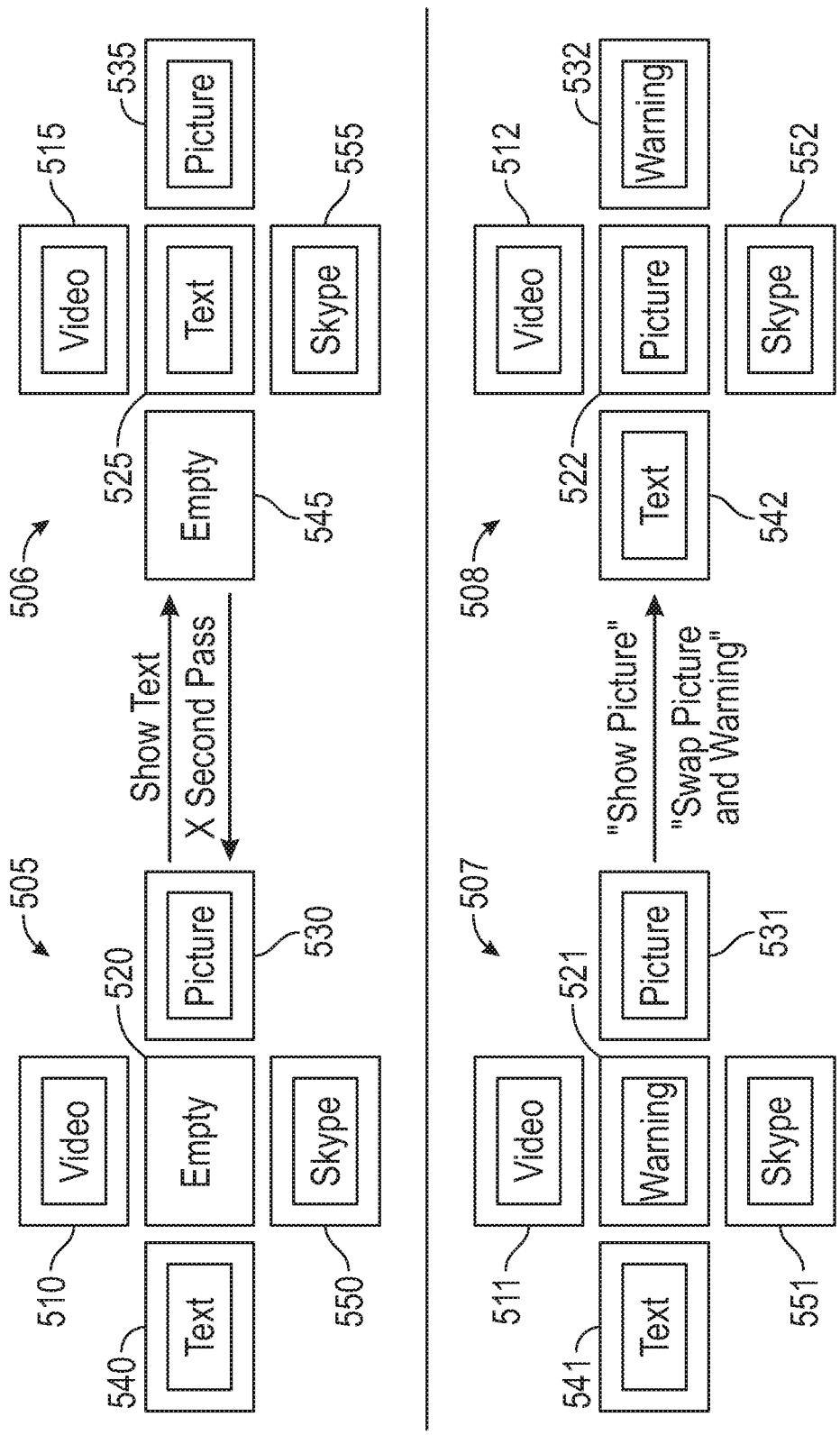
FIG. 5 illustrates content displayed in virtual screens of the head worn display for displaying content in accordance with various exemplary embodiments.

FIG. 5 illustrates a diagram of layouts of prior and subsequent states of virtual screens of virtual screens 500 with content control in accordance with an exemplary embodiment.

Similar to the states of layouts of virtual screens of FIG. 4, FIG. 5 illustrates states of layouts of virtual screens 500 of a first layout of virtual screens 505, a second layout of virtual screens 506, a third layout of virtual screens 507 and a fourth layout of virtual screens 508. In the first layout of virtual screens 505, there is a center virtual screen 520, right/left virtual screens 540, and 530 and top/bottom virtual screens 510, 550. Likewise, the second layout of virtual screens 506 has corresponding center virtual screen 525, right/left virtual screens 545, 535 and top/bottom virtual screens 515, 555. Similarly, the third layout of virtual screens 507 has corresponding center virtual screen 521, right/left virtual screens 541, 531 and top/bottom virtual screens 511, 551; and the fourth layout of virtual screens 508 has corresponding center virtual screen 522, right/left virtual screens 542, 532 and top/bottom virtual screens 512, 552.

In the first layout of virtual screens 505, there is text displayed in the virtual screen of display 540, video in the virtual screen of display 510; an app in the virtual screen of display 550 and image in the virtual screen of display 530. In an exemplary embodiment, the content on the virtual screen 545, 525, and 535 transitions to the left where the text on the virtual screen 540 to the left is then subsequently shown on the center virtual screen 525 which was previously empty.

That is, the content control embedded with GUIs integrated in the virtual screens may be configured to swap content after a period of time from a particular virtual screen to another virtual screen. In addition, the content may be controlled to pin the content to the right after a particular time x so the content is always visible. In other exemplary embodiments, the content may be configured to show a "warning" in the center virtual screen 521 or swap an image to show a picture in the virtual screen 522. In other words, the layout of virtual screens 500 can be configured in multiple ways, where by content control, the virtual screens in each virtual screen can be changed, swapped, as well as enabled to show dynamic video and streaming content.

By using commands (either in form of voice instructions, hand/head gestures, hardware buttons, or others), the user can interact with the screens—e.g. creating a content (showing content) on a certain screen, moving it to another screen, swapping contents of two screens, and so on. This creates a simple way of controlling the AR system, which addresses the interacting with the content which is limited by the size of the display particularly in mixed reality virtual screens of real objects and augmented reality objects of multiple layered views.

Because the virtual screens surrounding main virtual screen are easily accessible, the main virtual screen can remain empty for most of the time (i.e. limited to showing only important content—e.g. danger notifications—or content explicitly requested by user); therefore, the user can have a clear, non-obstructed view of his/her surroundings, increasing his/her situational awareness and addressing a diminishing of an users situational awareness by both obscuring of a particular viewpoint pathway and the significant scaling necessitated by the smaller display size resulting in the imagery not being readily discernable by the viewer.

Also, limiting the showing of content into a single screen is not always a viable solution as the virtual screens in smart glasses are quite small and can be used only for displaying either simpler graphics of just a few words or sentences; if e.g. more text is shown, it is difficult for the user to read the reduced sized text.

In various exemplary embodiments, the present disclosure describes by use of integrated contents showing dynamic content, configurations of virtual screens that enable an intuitive control and interaction with a large amount of content into AR domain without needing to use the established PC and tablet/smart phone paradigms for showing content and manipulation, which are not suitable for use with smart glasses or head worn virtual screens.

In various embodiments, the described swapping or switching of content from a particular screen to another screen can be enabled by extracting positional content of the user's head in relation to his/her torso to determine on which virtual screen(s) the user is directly viewing at a particular instance. For example, by using two inertial measurement units (IMUs), where one is in the smart glasses (smart glasses can be any commercial off the shelf (COTS) solution as IMU is a standard part of all commercially available solutions) which monitors the head movement and the other is located on the user's torso.

By the use of the two IMU's, one or more tensiometers, camera(s) measuring the head rotation, or other sensors, the user's head movements (relative to torso) can be calculated and the content of the virtual screens environment can be toggled or manipulated in coordination with motion or movement of the user. The amount of movement of motion is determined (i.e. in an example of two IMUs) by differences calculated between the sensor position data or found, for example, in the smart glasses and the additional sensor attached to the body of the user (i.e. the user's torso). This enables position calculations and use by any smart glasses with just an additional sensor coupled to the AR system. The additional sensor may be configured with an IMU, a camera, a tensiometer etc. Additionally, the dual sensors provide independent input to the system; there is no requirement that the sensors need to be connected to each but only the AR system.

In an alternate exemplary embodiment, a single sensor of a tensiometer or a sensor to measure muscle contractions or the like can replace the two IMUs and the single sensor is still sufficient to sense data of rotating differences of the positionally shifting of the viewer based on the movement of the viewer and the angle of view from the normal view of the viewer. That is, from the single sensor (which replaces one of the IMUs), the single sensor of the tensiometer or sensor to measure muscle contractions can measure the head rotation and the torso rotation from which the user's head movements (relative to torso) can be calculated and the content of the virtual screens environment can be toggled or manipulated in coordination with motion or movement of the user. In addition, with a single sensor and additional other sensor may still be added, In this instance, the other additional sensor would replace the other IMU and can be another IMU, tensiometer, a sensor to measure muscle contraction, or a camera to add to the sensed data already sensed data by the single sensor. This would augment the set of sensed data and with the augmented set of sensed data there is an increase in the precision of the entire data set of the rotating differences between the head and torso of the user. This enables an enhanced accurate detection of movements and angles of view of the user.

The application may be configured with a set of instructions to address the layout of the content of the graphic user interface on the virtual screens. The virtual screens may be configured with a 3×3 or 8+1 virtual screen layout where the primary virtual screen is visible when viewed by the user. The set of virtual screens may be configured in a manner in which 3 virtual screens, the virtual screen directly in front of the viewer, the virtual screens on either side adjacent to the front display are in nearly a line so that all may be viewed simultaneous from viewer side vision and front vision viewpoints. Another configuration is a cross display of the main virtual screen with upper and lower virtual screens as well as right and left virtual screen which form a cross like pattern for the display of the virtual screens.

Figure 6:
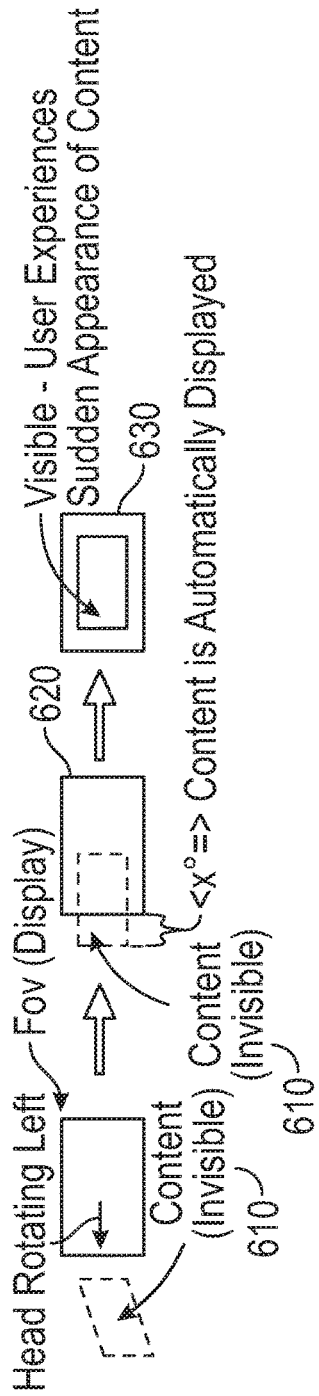
FIG. 6 illustrates content shown and switch for displaying content movement and slide in/slide out in virtual screens of the head worn display when displaying content in accordance with various exemplary embodiments.
Figure 6:
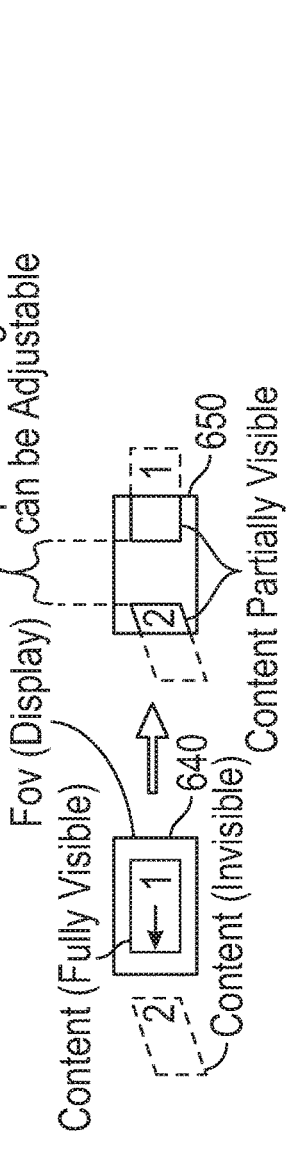
Figure 6:
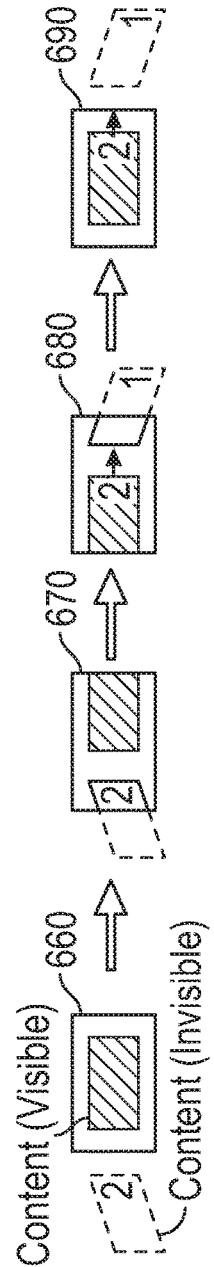

FIG. 6 illustrates a diagram of application control 600 of the contents and the switch between each virtual screens of the display in accordance with an embodiment.

At step 1 there is not shown a virtual screen with content within a frame of the display. That is, a full screen at 610 shows no content within a frame on a virtual screen of a field of view (normal view) at given degrees or angles "X0" location where either there are no virtual screens on either side of the full screen 610. In instances, the full screen 610 can be configured to be invisible to the user or visible to the view upon a normal view of the full screen 610 by the user. As the user (not shown) rotates his/her head to the left, then the content at 620 begins to appear (i.e. slides in) in a frame of the virtual screen for a location where <X0→resulting in the content automatically being pinned to a frame of the display of the screen until most of X0 has moved out of the frame of the display. Finally, at 630, the content which was invisible may be configured to suddenly appear when viewed by the user by the processor changing amount of content viewed based on the sensed data of the user from the head sensor and the torso sensor.

At step 2, there is shown a diagram of the dynamic interaction of the content with the sensed data of the user and the content is shown in a continuous movement over each virtual screen of the displays of the content. That is, the content at 640 may be configured to be fully visible within the field of view or normal view of the user at a given time. Initially, at 640 the content is not visible within the field of view but gradually becomes visible in response to a positional change or shift of the user's head or torso. At 650, the content becomes partially visible and is spaced apart from the prior content viewed to the user's normal view is limited to the amount of content viewed at once. In addition, the amount of content in the users field of view on each virtual screen of the display is also limited. For example, the subsequent content displayed at 650 on the virtual screen appears within the frame of the virtual screen incrementally or gradually from a limited or partial display to a full display of the entire content (i.e. a sliding in and sliding out operation) and then subsequently incrementally can be again partially obscured to fully obscured in the field of view of the frame of the virtual screen displayed. This can mimic an augmented reality setting or mixed reality of an user motion and viewing of an object and the movement of the user across an object or other entity.

At step 3, there is shown a diagram of application of a fading in and out of a content on a virtual screen. Initially, the content is invisible outside the frame of the screen of the display. At 660, the content becomes fully visible, then in subsequent step at 670, the state of the fully visible content is changed to become less visible and the subsequent content at 680 is made more visible. At 690, once the content is positioned within the frame of the field of view, the content is completely visible as the content is gradually repositioned outside the frame, the content becomes less visible. The visibility of the content is tied to the appearance and location of the content within a frame of the normal view of an user or a virtual screen having the attention of the user by the sensed positional data received of the user.

While the steps 1-3 in FIG. 6 disclose various exemplary embodiments, it is contemplated that the contents can be configured with many different configurations to mimic different tasks, to assist in viewing varying AR aspects of objects and other entities, to mimic dynamic motion and other mixed reality conditions when performing particular tasks. That is, the configurations described should not be construed as limiting of potential available configurations that may be suitable or desired by an user.

Figure 7:
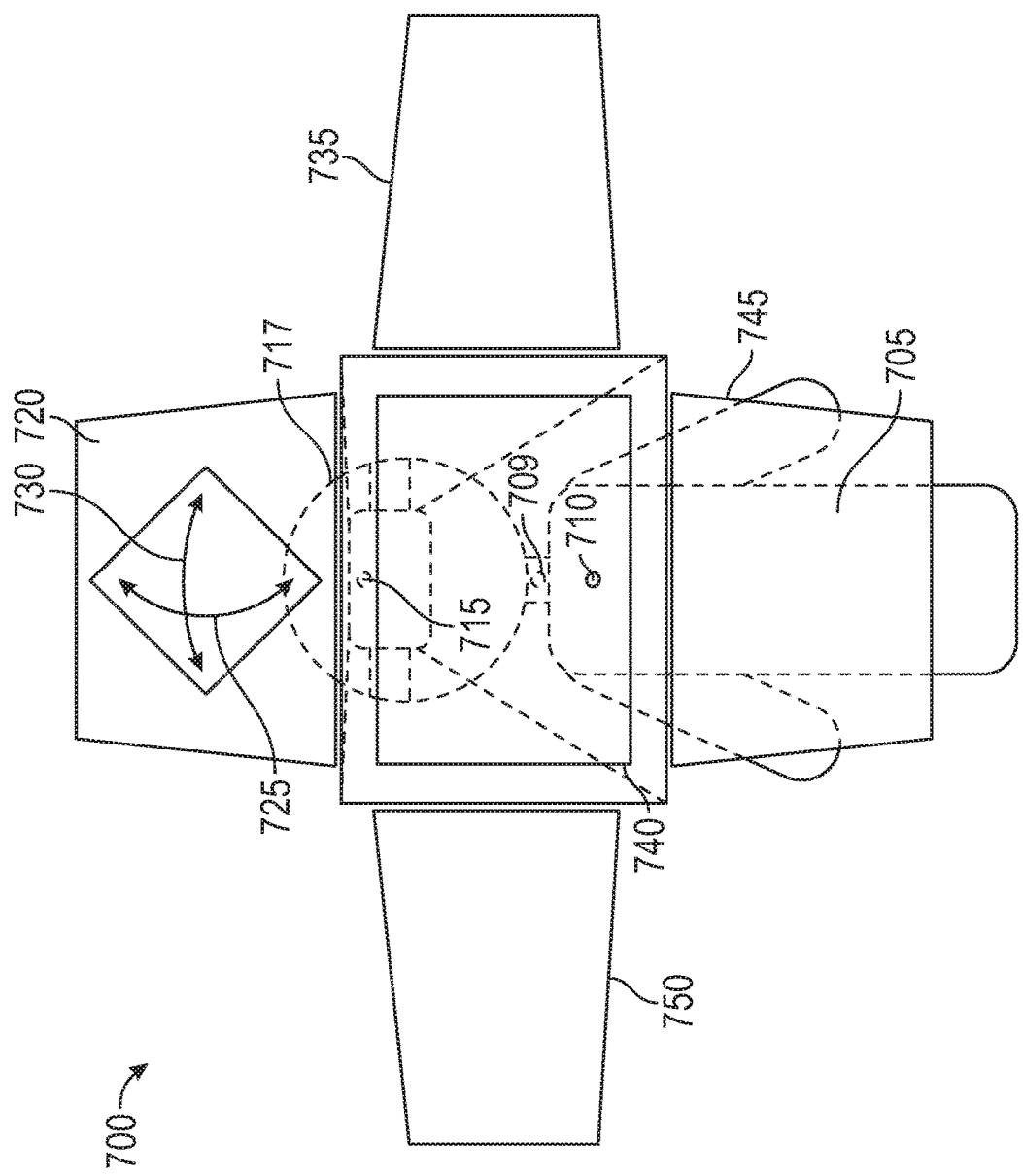
FIG. 7 illustrates content display system of virtual screens of the head worn display in relation to an user positioning and viewing of the content on the virtual screens in accordance with various exemplary embodiments.

FIG. 7 illustrates content display system of virtual screens of virtual screens of the head worn display in relation to an user positioning and viewing of the content on the virtual screens in accordance with various exemplary embodiments.

In FIG. 7, in the content display system 700, there is a first IMU1 715 and a second IMU2 710 that are able to detect and to determine rotations of the user 705 in an angular vertical direction 725 and an angular horizontal direction 730. In FIG. 7 the difference between IMU1 715 and IMU2 720 is zero. The user is equipped with the 2 IMUs which are configured to be able to track movement and rotation of his torso and head. The first IMU1 715 is attached to the user head 717. In an exemplary embodiment, the IMU1 715 may be integrated with the HWD or may be a standalone device with BLUETOOTH® or WIFI® or other possible (including wired) connectivity to processors of the vehicle or the HWD. The other IMU, IMU2 710 is attached to the body or torso of the user 705. The user 705, in a particular instance, would be positioned and view directed to one of the virtual screens 740, 745, 720, 735 or 750. As the user 705 rotates his/her body or head in the direction of a particular virtual screen, the IMUs would be able to anticipate the virtual screen that the user 705 attention is directed to or about to be directed to. This anticipation data is sent to the processors of the vehicle or HWD and the content displayed on the virtual screens 740, 745, 720, 735 or 750 is dynamically moved or inserted in the appropriate virtual screen 740, 745, 720, 735 or 750 in response to the user 705 rotation or in response to particular position of the user 705. With two IMUs, there is no need to track movement, but simply to determine a rotation of the user 705 head or body. Although, movement can be tracked of the user 705 by both IMUs, by configuring the IMUs to detect rotation of the user 705 head or body, a limited or a slight angular movement can allow for directional dynamic changes of the viewing content.

In various exemplary embodiments, the IMUs can be located on the head/smart glasses of the user 705 and on the torso of the user 705. Each of the IMUs is configured to sense changes in the x,y,z axes and further is configured to determine using various algorithms and use history a current rotation in the three axes. That is, a particular configuration or profile can be determined for each user and the IMUs can be configured with the profile. For example, a user may rotate his head more than his body or may rotate his head very little with no body rotation and the IMUs can be calibrated or trained to detect more subtle changes.

In various exemplary embodiments, the content display system 700 is initially calibrated in a calibration phase which is either automated when the content display system 700 is triggered on, or commences when the user 705 makes an explicit request such as by speech command, gesture, or by pressing a button (speech recognition and gesture may be configured in to the HWD as desired) and an application solution measures a current value from IMU1 715 and IMU2 710, calculates the difference between the values and this difference as an initial baseline. In this initial step, the user 705 would be positioned and viewing the center virtual screen or virtual screen 740 which is the common first virtual screen viewed by users as determined by empirical testing since the virtual screen 740 is directly in front of the user 705. That is, in the majority of the cases, the primary screen directly in front of the body or torso, which is the most natural default viewing position. In such instances, the default head rotation is usually up and/or either a rotation to the left or the right direction to view virtual screens surrounding the primary center virtual screen which is virtual screen 740. Hence, the images or content displayed on the other virtual screens is performed with the assumption that the initial calibration has the primary screen in front of the user's torso.

In an alternate exemplary embodiment, a single sensor 709 of a tensiometer or a sensor to measure muscle contractions or the like can replace the two IMUs 715, 710 and the single sensor 709 will be sufficient to sense data of rotating differences of the positionally shifting of the viewer based on the movement of the viewer and the angle of view from the normal view of the viewer. That is, from the single sensor 709 (which replaces one of the IMUs), the single sensor 709 of the tensiometer or sensor to measure muscle contractions can measure the head rotation and the torso rotation from which the user's head movements (relative to torso) can be calculated and the content of the virtual screens environment can be toggled or manipulated in coordination with motion or movement of the user. In addition, with a single sensor and additional other sensor (for example one of the IMUs 710, 715 or another sensor with the single sensor 709) may still be added, In this instance, the other additional sensor would replace the other IMU and can be another IMU, tensiometer, a sensor to measure muscle contraction, or a camera to add to the sensed data already sensed data by the single sensor. This would augment the set of sensed data and with the augmented set of sensed data there is an increase in the precision of the entire data set of the rotating differences between the head and torso of the user. This enables an enhanced accurate detection of movements and angles of view of the user.

Figure 8:
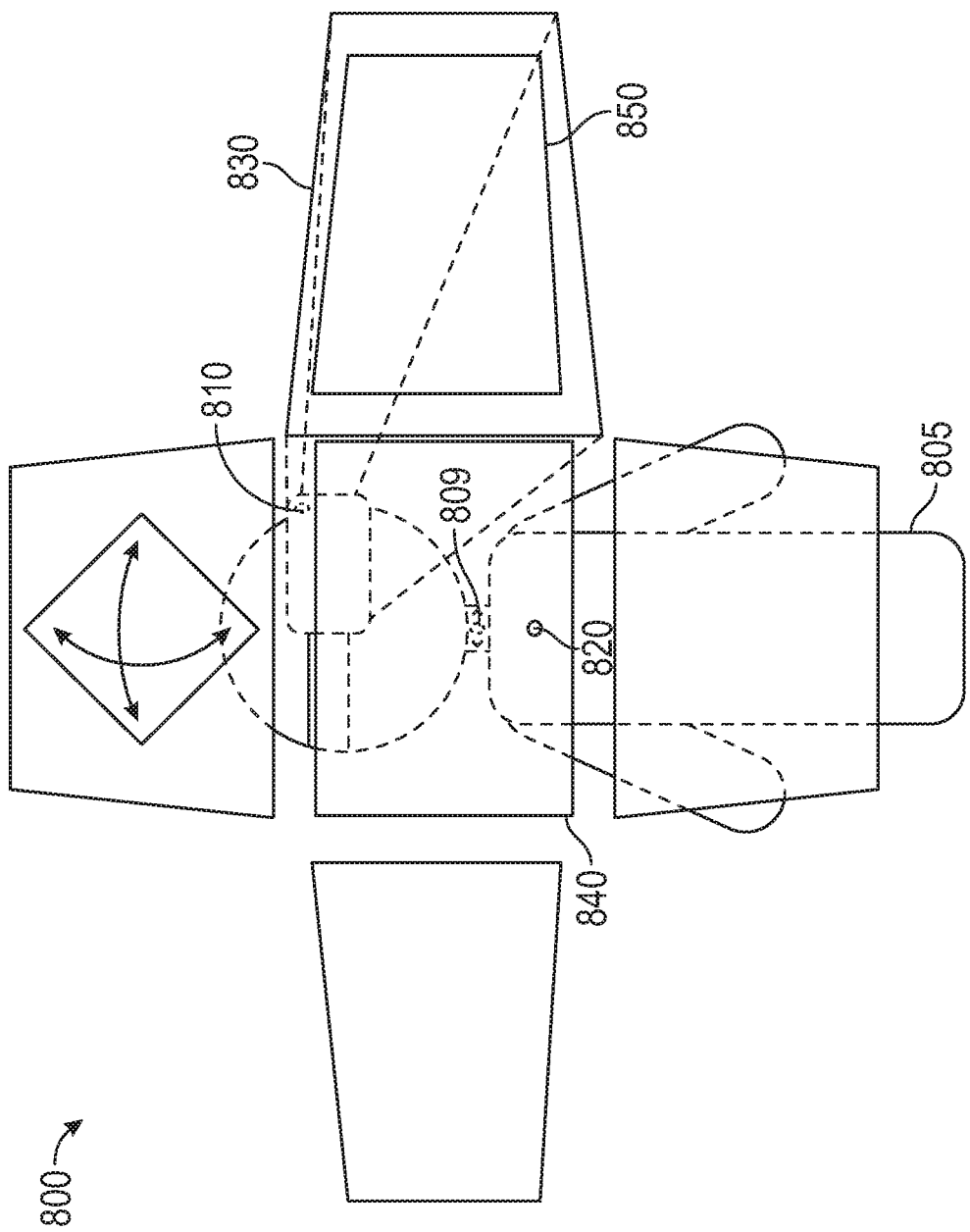
FIG. 8 illustrates content display system of virtual screens of the head worn display in relation to an user positioning and viewing of the content on the virtual screens in accordance with various exemplary embodiments.

FIG. 8 illustrates content display system of virtual screens of the head worn display in relation to an user positioning and viewing of the content on the virtual screens in accordance with various exemplary embodiments. In FIG. 8 for IMU1 810 and IMU2 820 shows that there is a rotational difference in Y axis between IMU1 810 and IMU2 820 which moves the virtual screens accordingly, so the user has an impression he/she is "looking around" (or in this case, "looking left"; relative to a baseline difference determined during the initial calibration), the content display system 800 recognizes that user 805 has a viewpoint directly straight ahead when the user 805 views the primary virtual screen 840 (i.e. the virtual screen in the center of the "cross of screens"); When the user 805 views the virtual screen 850 on the left (i.e. the virtual screen that the user 805 attention is directed to at the particular instance) the user 805, in this instance, views the "Quick Access Virtual Screen" (See FIG. 2). However, when the user 805 looks "left" (i.e the user is position behind the virtual screens and viewpoint is from behind the virtual screens), the IMU2 820 is still sending the same values of x,y,z to the content display system 800, while the other IMU, the IMU1 810 is generating values indicating there is rotation in y-axis to a virtual screen 830. So, the content display system 800 recognizes a need to move or position (in fact to rotate with the central point being the user 805) the virtual screens accordingly to the right. Additionally, in the alternate embodiment, a single sensor 809 could be used to replace IMU1 810 and IMU2 820 as described above with respect to FIG. 7.

Figure 9:
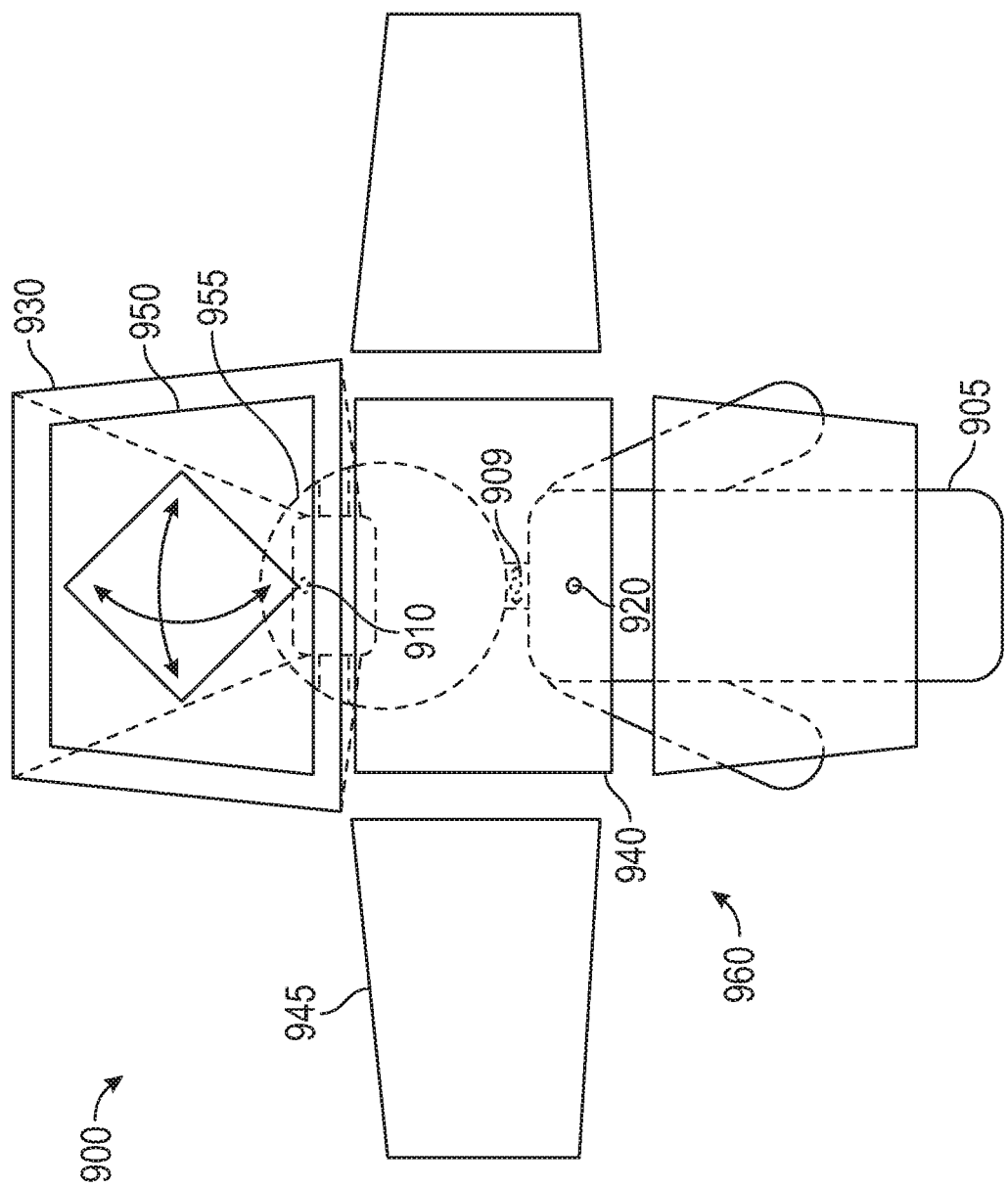
FIG. 9 illustrates content display system of virtual screens of the head worn display in relation to an user positioning and viewing of the content on the virtual screens in accordance with various exemplary embodiments.

FIG. 9 illustrates content display system 900 of virtual screens of the head worn display in relation to an user positioning and viewing of the content on the virtual screens in accordance with various exemplary embodiments. FIG. 9 shows the relative rotation between IMU1 910 and IMU2 920 that there is a rotational difference in x-axis between IMU1 910 and IMU2 920 which moves the virtual screens accordingly, so the user has an impression he/she is "looking around" (or in this case, "looking up"; relative to a baseline difference determined during the initial calibration), the content display system 900 recognizes that user 905 has a viewpoint directly straight ahead when the user 905 views the primary virtual screen 940 (i.e. the virtual screen in the center of the "cross of screens"). When the user 905 views the virtual screen 950 on top (i.e. the virtual screen that the user 805 attention is directed to at the particular instance) the user 905, in this instance, views the "Quick Access Virtual Screen" (See FIG. 2). However, when the user 905 looks "up" (i.e the user 905 can be considered position behind or in front of the virtual screens, in both instances the viewpoint of a movement up is a view of the same top virtual screen 950), the IMU2 920 is still sending the same values of x,y,z to the content display system 900, while the other IMU, the IMU1 910 is generating values indicating there is rotation in x-axis to a virtual screen 950. So, the content display system 900 recognizes a need to move or position (in fact to rotate with the central point being the user 905) the virtual screens accordingly downward. Additionally, in the alternate embodiment, a single sensor 909 could be used to replace IMU1 910 and IMU2 920 as described above with respect to FIG. 7.

That is, when the user 905 looks upward, the IMU1 920 is still sending the same values of x,y,z to the content display system 900, while the other IMU, the IMU2 910 is generating values indicating there is rotation in x-axis 930. So, the content display system 900 recognizes a need to move or position (in fact to rotate with the central point being the user 905) the virtual screen 950 accordingly down so the user 905 does not have to change is view of attention to the primary virtual screen 940. The user torso and head rotations are not limited in either the x or y axis and the user 905 can rotate his/her head in multiple axes at once (e.g. both x and y, causing rotation of the content of the virtual screen both e.g. up and right).

In various exemplary embodiments, if the user 905 turns completely both his torso and head at once, the virtual screens still remain around the user 905 and the user 905 is still looking at the virtual primary screen 940. Hence, the user 905 is not required need to look for the virtual primary screen 940; the virtual primary screen 940 is always placed in front of the user 905 and the user 905 to view the left virtual screen 945, needs only to turn the user's head 955 left and so on.

In various exemplary embodiments, the IMU 910 is a tensiometer that can determine the head 955 movement by measuring how different parts of the neck 960 are extended of flexed. For example, such a solution can measure muscle contractions and determine rotations in the x and y axis.

Figure 10:
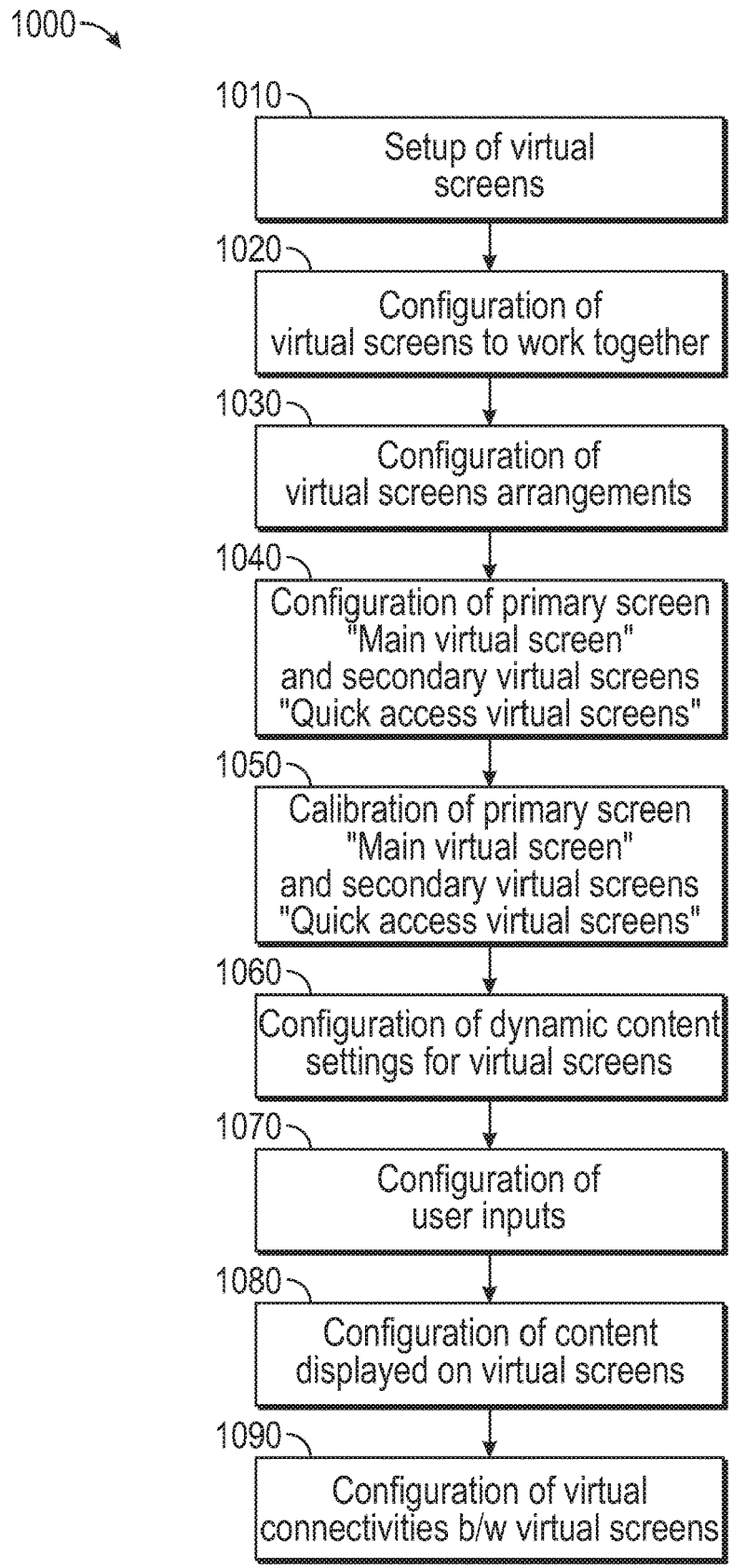
FIG. 10 illustrates a flowchart of the implementation of the content display system for displaying content on virtual screens in accordance with various exemplary embodiments.

FIG. 10 illustrates a flowchart of tasks for configuring an application for control of the switches with the layout of virtual screens in accordance with an embodiment.

Initially, at task 1010 the application as configured by the user or by a default configuration sets up the initial layout of virtual screens. The primary virtual screen (i.e main screen) is the virtual screen that is in the direction of the normal view of the viewer while the secondary screens (i.e. the "quick access screens" in this instance) are placed around the primary screen. For example, the secondary screens are placed up/down and right/left of the primary screen. In addition, other features of the content display system may be set up such as the following: the virtual screens layout which may in an exemplary embodiment be configured with the following layouts (though other layouts are feasible as desired and the particular layout described should not be construed as limiting): a. 3×3 (8+1 virtual screen); b. 3 virtual screens in a line; c. a cross of virtual screens (4+1); d. flower/hexagon or arbitrary layout of virtual screens.

Next, at task 1020, the dynamic settings are determined by the processor and include the initial basis of the rotation of the head and torso of the viewer from an x-axis and y-axis to determine a change when the viewer moves, changes position and changes the viewer attention from a particular virtual screen to another virtual screen. In an exemplary example a set of setting must be configured by the processor to enable the content displayed to switch among layouts based on number of screens in active use, scenario, and user preferences. Other dynamic settings include the sliding in and out of content from each virtual screen to the primary virtual screen with the normal view in order to limit the amount of content on the primary screen so as not to obstruct a view of the viewer when viewing the primary virtual screen.

At task 1030, the virtual screen size can be configured and includes receiving APIs of virtual screens to configure screens and setting the screen sizes with the following qualities: of an uniform size; the normal or main window screen of a size that fits into smart glasses or HWD; other secondary virtual screens may be smaller in size if desired or irregular in shape to show depth or other attributes of a AR field of view; and the virtual screens may be resize or changed in scale to a full screen when viewed or in the normal view of the user. In addition, the processor can configure virtual screens of regular or irregular shapes based on mixed reality or AR effects that are desired to be achieved by the user.

At task 1040, further setting of the center display are configured and include: a "normal view" screen settings of an blank or transparent by default so as not to obscure a normal view of the user field of vision when wearing the HWD; the content of other virtual screens can be set to be temporal or to toggle, switch, or proceed to the next virtual screen of and/or be obscured or removed from display in a particular virtual screen display. These actions could occur in response to an automated pre-set timer, an user's gesture, or after an explicit command by the processor or user has been issued.

At task 1050, the calibration of the main window position on the screen is positioned with respect to the viewer. The calibration may include: a calibrating of the main window or primary virtual screen in the normal view of the user and can be positioned by determining a direction of a viewpoint of the user. Also, subsequently repositioning of the primary virtual screen can occur depending on the sensed actions of the user and a determined viewpoint (i.e. normal view of the user) determined by application solutions of the processer (See FIG. 1, i.e. processor 110). Other calibrations of the virtual screens can be performed by confirming the position explicitly by responses of the user or implicitly by use or viewing by the user when performing a task. In addition, the processor by can used particular application solutions to make determinations of usefulness to the user of the position a position of the virtual screen. For example, such processor solution can occur when the user is performing unique tasks such as when lying on ground or when primary virtual screen position is shifted due to sensor data errors. There are also alternate configurations which may include: dividing a virtual screen into sub-virtual screens, allowing for different content (i.e. event content) to be viewed on the divided virtual screen. In addition, divided virtual screens allow for connecting with neighboring screens to form one bigger to be able to show more content. For example, in such instances, the user needs to move his head in order to see the rest of this bigger virtual screen.

Next, at task 1060, the dynamic content setting for the screens may be configured and include: a moving or making of a change of a displayed content on the virtual screens by a widget control action of attaching the content to a virtual screen; replacing/sliding in/sliding out of an existing content with a new content on the particular virtual screen; inserting an virtual screen with content, shifting existing virtual screens; swapping content in pairs or multiple sets of virtual screens; and disconnecting a display of content from a virtual screen.

At task 1070, the input controls or interfaces may be configured by the user or may configured in a default set of controls. The input controls can include: controlling a set of interfaces for input responses in the virtual screens for speech commands of selecting a viewing speech interface to the AR content system; a set of hand gestures detected by proximity or the like detectors of the user; a gaze detection via an IR detector for detecting gaze actions of the user or other detection applications configured in the HWD; a set of hardware buttons (i.e. external keyboards or buttons on smart glasses etc.); and a combination of one or more of the previous modalities described (e.g. gaze and speech—"swap this screen with that").

At task 1080, the display of the content for each virtual screen may be configured as follows: a particular configuration of a primary virtual screen with secondary virtual screens displayed when the user maintains a visual attention of the content on the primary or secondary virtual screens. The configurations may include: a pinning or statically placing in the smart glasses or in a virtual screen of an HWD a majority/minority of the content in the virtual screen in a least obtrude manner to enable a normal view in the primary or secondary virtual screens. This eliminates small head movements and errors caused by the HWD which can result in shaking of the virtual screen. Another configuration is turning the virtual screens transparent when out of focus and making the virtual screens less opaque the more the user turns his/her head to see the content on a virtual screen. This results in better situation awareness and less confusion when viewing the content on the virtual screens as turning a particular virtual screen opaque prevents interference with an user's peripheral field of view and enables the user to focus the user's attention on a particular virtual screen or a particular set of virtual screens. Yet another configuration is having all screens permanently visible for a complete view of all content available at a given time. Finally, a last configuration is any potential combination of all above type configuration (i.e. for example having some virtual screens visible and some virtual screens opaque depending on the content, on the user position, and the maintenance operation actions described or needed to be done).

At task 1090, the interactions or connectivity between virtual screens may be configured to enable an efficient display of content on the virtual screens during the maintenance operation. The connectivity's that may be defined include: the relationships among virtual screens in placement as well as in content displayed. Other connectivity's include when defining interactions of unrelated content and distantly spaced virtual screens, or different types/sizes of virtual screens. For example, each virtual screen can be configured to behave individually or in unison. Also, connectivity's include the related viewing of content on sets of virtual screens and a change in content on one virtual screen which results or propagates in changes or potential changes in some or all related virtual screens (e.g. switching to next textual instruction on one screen updates schematics and video instructions on other related screens or on multiple screens).

It is contemplated that the order of the steps in FIG. 10 (i.e. steps 1010 to 1090) may be changed, re-configured as desired, reduced, and augmented in an arbitrary manner or by a particular as assignment, and the order of steps presented is an exemplary embodiment that should not be construed as limiting.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer content. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, include one or more physical or logical modules of computer instructions that may, for instance, be organized as an object, procedure, or function. Nevertheless, the executables of an identified module need not be physically located together, but may include disparate instructions stored in different locations that, when joined logically together, include the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method to augment, virtualize, or present mixed reality of content in order to display a larger amount of content on a head worn device (HWD), the method comprising:
   creating a set of virtual screens in the display of the HWD deployed in a manner to both surround and positionally shift from a movement of a viewer to provide an immersive viewing experience to the viewer wherein the set of virtual screens comprises: at least a primary virtual screen and one or more secondary virtual screens wherein the primary virtual screen is located in a manner to permit a normal view and the one or more secondary virtual screens are located around the primary virtual screen positioned in a set of placements comprising: a right/left and up/down, a default or an arbitrary placement about the primary virtual screen within a view of the viewer;
   enabling the immersive viewing experience by generating dynamic virtual screen arrangements by a processor associated with the set of virtual screens wherein the set of virtual screens surrounds the viewer and enable the processor to change in real-time the content displayed on each virtual screen;
   connecting a first sensor attached to a head of the viewer and a second sensor attached to a torso of the viewer for generating sensed data of rotating differences of the position shift of the viewer based on the movement of the viewer and an angle of view from the normal view of the viewer; and
   configuring the content on each virtual screen of the set of virtual screens, by the processor, based on the dynamic virtual screen arrangements and sensed data from the first and second sensors of rotating differences of the head and torso of the viewer and by utilizing software solutions by the processor to determine a particular virtual screen having a visual attention of the viewer wherein the visual attention is directed to the virtual screen the viewer is currently viewing or is about to view in a near future.

2. The method of claim 1 wherein the first and second sensors comprise: inertial measurement units (IMUs).

3. The method of claim 1, further comprising:
   replacing the first and second sensors with a single sensor to measure muscle contractions of the viewer or a tensiometer wherein the single sensor is sufficient for generating sensed data of rotating differences of the positionally shifting of the viewer based on the movement of the viewer and the angle of view from the normal view of the viewer.

4. The method of claim 3, further comprising:
   adding a second sensor for use with the single sensor wherein the second sensor is one of a set of sensors which comprise: an IMU, tensiometer, a sensor to measure muscle contraction, or a camera to augment the sensed data of the single sensor to increase a precision of a data set of the sensed data comprising rotating differences between the head and torso of the viewer to enable more accurate detection of movements and angles of view of the viewer.

5. The method of claim 1, further comprising:
   changing, by the processor in response to rotating differences of the head and the torso of the viewer, an amount of content displayed on each virtual screen wherein the content displayed on a particular virtual screen is viewed either as standalone or as connected with content displayed by other virtual screens of the set of virtual screens.

6. The method of claim 5, wherein the content displayed further comprising:
   highlighting, by the processor, areas of interests of a particular virtual screen connected to a corresponding set of information comprising: textual instructions, 3D modeling, other related information, unrelated information or desired information by the viewer on another particular virtual screen.

7. The method of claim 5, further comprising:
   changing an amount of content displayed, by the processor, by sliding in/out the amount of content displayed on each virtual screen in response to a continuous movement of the head of the viewer, the sliding in/out determined by the sensed data to maintain, in the virtual screen having the visual attention of the viewer, relevant content within a normal view of the viewer wherein sliding in/out the amount of content based on a continuous monitoring by the processor of the sensed data of rotating differences of at least the head of the viewer.

8. The method of claim 1, further comprising:
   receiving commands by the HWD from the viewer to provide convenient accessibility for executing actions of creating content, interacting with the content, and swapping the content on each virtual screen of the set of virtual screens wherein the commands comprise: voice, touch, gaze, commands from hardware controllers via standalone buttons or attached keyboards, and gesture commands or in a combination.

9. The method of claim 8, further comprising:
   configuring, by the processor for the convenient accessibility, the virtual screen having the visual attention of the viewer to remain sparsely filled or nearly empty with content by displaying remaining content on the one or more secondary virtual screens or only displaying a limited amount of content on the virtual screen having the visual attention of the viewer.

10. The method of claim 1, wherein each virtual screen comprises: regular and irregular shapes.

11. A system to augment, virtualize, and present mixed reality of content in order to display a larger amount of content on a head worn device (HWD), the system comprising:
a set of virtual screens created in the display of the HWD deployed in a manner to both surround and positionally shift from a movement of a viewer to provide an immersive viewing experience to the viewer wherein the set of virtual screens comprises: at least a primary virtual screen and one or more secondary virtual screens wherein the primary virtual screen is located in a manner to permit a normal view and the one or more secondary virtual screens are located around the primary virtual screen positioned in a set of placements comprising: a right/left and up/down, a default or an arbitrary placement about the primary virtual screen within a view of the viewer;
a processor associated with the set of virtual screens that is configured to generate the immersive viewing experience by generating dynamic virtual screen arrangements in the set of virtual screens surrounds the viewer and the processor is enabled to change in real-time the content displayed on each virtual screen;
a first sensor attached to a head of the viewer and a second sensor attached to a torso of the viewer for generating sensed data to the processor of rotating differences of the shift of the viewer based on the movement of the viewer and an angle of view from the normal view of the viewer; and
the processor configured to generate content on each virtual screen of the set of virtual screens based on the dynamic virtual screen arrangements and the sensed data from the first and second sensors of rotating differences of the head and torso of the viewer from software solutions executed by the processor to determine a particular virtual screen having a visual attention of the viewer wherein the visual attention is directed to the virtual screen the viewer is currently viewing or is about to view in a near future.

12. The system of claim 11 wherein the first and second sensors comprise: inertial measurement units (IMUs).

13. The system of claim 12, further comprising:
a single sensor of either a sensor to measure muscle contractions of the viewer or a tensiometer to replace the first and second sensors wherein the single sensor is sufficient to generate the sensed data of rotating differences of the position shift of the viewer based on the movement of the viewer and the angle of view from the normal view of the viewer.

14. The system of claim 13, further comprising:
adding a second sensor for use with the single sensor wherein the second sensor is one of a set of sensors which comprise: an IMU, a tensiometer, a sensor to measure muscle contractions, or a camera to augment sensed data of the single sensor to increase precision of a data set of sensed data of rotating differences between the head and torso of the viewer enabling more accurate detection by the processor of movements and angles of view of the viewer.

15. The system of claim 11, further comprising:
the processor configured to generate a change in an amount of content displayed on each virtual screen in response to rotating differences of the head and the torso of the viewer, wherein content displayed on a particular virtual screen is viewed either as standalone or as connected with content displayed by other virtual screens of the set of virtual screens.

16. The system of claim 15, further comprising:
the processor configured to highlight areas of interests of a particular virtual screen connected to a corresponding set of information which comprises: textual instructions, 3D modeling, other related information, unrelated information or desired information by the viewer on another particular virtual screen.

17. The system of claim 15, wherein the change of the amount of content displayed by:
the processor configured to slide in/out an amount of content displayed on each virtual screen in response to a continuous movement of the head of the viewer, the slide in/out determined by the sensed data to maintain, in the virtual screen having the visual attention of the viewer, relevant content within a normal view of the viewer wherein the slide in/out of content is based on a continuous monitoring by the processor of the sensed data of rotating differences of at least the head of the viewer.

18. The system of claim 11, further comprising:
the processor configured to generate a set of commands for receipt by the HWD from the viewer to provide convenient accessibility for executing actions of creating content, interacting with the content, and swapping the content on the virtual screens wherein the set of commands comprise: voice, touch, gaze, commands from hardware controllers via standalone buttons or attached keyboards, and gesture commands or in a combination.

19. The system of claim 18, further comprising:
the processor configured to generate a configuration of the set of virtual screens for the convenient accessibility wherein the virtual screen having the visual attention of the viewer to remain sparsely filled or nearly empty with content by displaying remaining content on the one or more secondary virtual screens or only displaying a limited amount of content on the virtual screen having the visual attention of the viewer.

20. A non-transitory computer-readable medium containing instructions thereon, which, when executed by a processor, perform a method to augment, virtualize, or present mix reality in order to display a larger amount of content on a display of a head worn device (HWD) to maintain an unobstructed view to a viewer, the method comprising:
creating a set of virtual screens in the display of the HWD deployed in a manner to both surround and positionally shift from a movement of the viewer to provide an immersive viewing experience to the viewer wherein the set of virtual screens comprises: at least a primary virtual screen and one or more secondary virtual screens wherein the primary virtual screen is located in a manner to permit a normal view and the one or more secondary virtual screens are located around the primary virtual screen positioned in a set of placements comprising: a right/left and up/down, a default or an arbitrary placement about the primary virtual screen within a view of the viewer;
enabling the immersive viewing experience by generating dynamic virtual screen arrangements by a processor associated with the set of virtual screens wherein the set of virtual screens surrounds the viewer and enable the processor to change in real-time the content displayed on each virtual screen;

connecting a first sensor attached to a head of the viewer and a second sensor attached to a torso of the viewer for generating sensed data of rotating differences of the positionally shift of the viewer based on the movement of the viewer and an angle of view from the normal view of the viewer; and configuring the content on each virtual screen of the set of virtual screens, by the processor, based on the dynamic virtual screen arrangements and the sensed data from the first and second sensors of rotating differences of the head and torso of the viewer by implementing software solutions by the processor to determine a particular virtual screen having a visual attention of the viewer wherein the visual attention is directed to the virtual screen the viewer is currently viewing or is about to view in a near future.

* * * * *